US010222119B2

(12) United States Patent
Rezayat

(10) Patent No.: US 10,222,119 B2
(45) Date of Patent: Mar. 5, 2019

(54) DEPLOYABLE TEMPERATURE CONTROLLED SHED WITH REMOTE MANAGEMENT

(71) Applicant: Mohsen Rezayat, Cincinnati, OH (US)

(72) Inventor: Mohsen Rezayat, Cincinnati, OH (US)

(*) Notice: Subject to any disclaimer, the term of this patent is extended or adjusted under 35 U.S.C. 154(b) by 0 days.

(21) Appl. No.: 15/203,380

(22) Filed: Jul. 6, 2016

(65) Prior Publication Data

US 2017/0146287 A1 May 25, 2017

Related U.S. Application Data

(60) Provisional application No. 62/257,936, filed on Nov. 20, 2015.

(51) Int. Cl.
*F25D 29/00* (2006.01)
*F25D 13/00* (2006.01)
(Continued)

(52) U.S. Cl.
CPC .......... *F25D 29/00* (2013.01); *F25B 27/002* (2013.01); *F25D 13/00* (2013.01); *F25D 13/04* (2013.01);
(Continued)

(58) Field of Classification Search
CPC .. F25D 29/00; F25D 2700/02; F25D 2700/08; F25D 13/00; F25D 13/04;
(Continued)

(56) References Cited

U.S. PATENT DOCUMENTS 3,237,415 A * 3/1966 Newton ............... F25B 21/02
62/185
4,738,113 A * 4/1988 Rudick ............... F25B 21/02
62/3.5
(Continued)

FOREIGN PATENT DOCUMENTS

EP 2683146 A1 1/2014
WO WO 2014/009541 A2 1/2014

OTHER PUBLICATIONS

International Search Report and Written Opinion dated Apr. 6, 2017 for Application No. PCT/US2016/059855, 37 pgs.

*Primary Examiner* — Adnan Aziz
(74) *Attorney, Agent, or Firm* — Frost Brown Todd LLC

(57) ABSTRACT

A cold-shed may be deployed in areas with little or no electrical infrastructure in order to provide a cold storage area for perishable goods including agricultural, dairy products, medicines, vaccines, etc. A wireless communication device may be installed in the cold-shed to allow remote management, access control, and monitoring of the cold-shed devices, including cooling units, solar power cells, batteries, power conditioners, and a variety of sensors to determine internal and external temperatures, door positions, and other information. A mobile device configured to communicate with the wireless communication device may receive information and updates via cellular networks or text messaging. The mobile device may also be used to change temperature settings, lock and unlock doors, conduct inventory management and auditing, and make other changes. The corresponding application allows an owner to manage and monitor many cold-sheds from a single mobile device.

9 Claims, 18 Drawing Sheets

(51) Int. Cl.
*F25D 13/04* (2006.01)
*G08B 21/18* (2006.01)
*H02S 20/32* (2014.01)
*F25B 27/00* (2006.01)
*G06Q 10/08* (2012.01)
*G07C 9/00* (2006.01)
*G08B 17/06* (2006.01)

(52) U.S. Cl.
CPC ......... *F25D 29/008* (2013.01); *G06Q 10/087* (2013.01); *G07C 9/00134* (2013.01); *G07C 9/00896* (2013.01); *G08B 17/06* (2013.01); *G08B 21/182* (2013.01); *H02S 20/32* (2014.12); *F25D 2700/02* (2013.01); *F25D 2700/12* (2013.01); *G05B 2219/37431* (2013.01); *Y02A 40/966* (2018.01)

(58) Field of Classification Search
CPC .. F25D 11/003; F25D 11/006; F25D 2201/14; F25D 2700/12; F25B 27/00; F25B 27/002
See application file for complete search history.

(56) References Cited

U.S. PATENT DOCUMENTS

| | | | |
|---|---|---|---|
| 5,054,295 | A | 10/1991 | Goulooze |
| 5,225,997 | A | 7/1993 | Lederer et al. |
| 5,361,982 | A | 11/1994 | Liebl et al. |
| 5,798,694 | A * | 8/1998 | Reber .................... B65D 77/24 340/10.41 |
| 5,966,956 | A | 10/1999 | Morris et al. |
| 6,633,823 | B2 | 10/2003 | Bartone et al. |
| 7,149,658 | B2 * | 12/2006 | Kadaba .............. G06K 19/0717 340/572.1 |
| 7,342,506 | B2 | 3/2008 | Paoli et al. |
| 7,349,766 | B2 | 3/2008 | Rodgers |
| 7,469,549 | B2 * | 12/2008 | Ahlberg ................ F25D 29/003 236/1 C |
| 7,586,409 | B2 | 9/2009 | Armstrong et al. |
| 7,673,464 | B2 | 3/2010 | Bodin et al. |
| 7,775,056 | B2 | 8/2010 | Lowenstein |
| 8,299,645 | B2 | 10/2012 | Muchow et al. |
| 8,421,630 | B2 | 4/2013 | Butler et al. |
| 8,461,958 | B2 | 6/2013 | Saenz et al. |
| 8,648,495 | B2 | 2/2014 | Chou et al. |
| 8,704,678 | B2 | 4/2014 | Wang et al. |
| 8,922,356 | B2 | 12/2014 | Lambert et al. |
| 9,058,128 | B1 | 6/2015 | Robison et al. |
| 9,210,220 | B2 | 12/2015 | Steckley et al. |
| 9,272,811 | B1 * | 3/2016 | Ranade ............. B65D 19/0095 |
| 9,344,330 | B2 | 5/2016 | Jacob et al. |
| 9,472,090 | B2 | 10/2016 | Sager |
| 9,579,245 | B2 * | 2/2017 | Larkner ............... G06Q 10/087 |
| 9,664,793 | B2 * | 5/2017 | Stinson ................ G01S 19/14 |
| 2004/0139757 | A1 * | 7/2004 | Kuehl ................ B60H 1/00592 62/237 |
| 2004/0226309 | A1 * | 11/2004 | Broussard ............ F25D 11/003 62/236 |
| 2005/0046567 | A1 * | 3/2005 | Mortenson ........... G06Q 10/047 340/539.13 |
| 2005/0248455 | A1 * | 11/2005 | Pope ...................... G01K 1/024 340/539.27 |
| 2007/0095905 | A1 * | 5/2007 | Kadaba .............. G06K 19/0717 235/384 |
| 2008/0047282 | A1 * | 2/2008 | Bodin .................... G06Q 10/08 62/129 |
| 2008/0184719 | A1 * | 8/2008 | Lowenstein ............ F25D 29/00 62/127 |
| 2009/0254277 | A1 | 10/2009 | Davey et al. |
| 2010/0000247 | A1 | 1/2010 | Bhatti et al. |
| 2010/0103327 | A1 * | 4/2010 | Lentz ..................... H04N 7/163 348/714 |
| 2011/0163603 | A1 * | 7/2011 | Chou ..................... H02J 3/381 307/66 |
| 2011/0193710 | A1 * | 8/2011 | McIlvain ................. B60P 3/20 340/585 |
| 2011/0202170 | A1 * | 8/2011 | Dawes .................... F25D 29/00 700/215 |
| 2012/0274470 | A1 * | 11/2012 | Sandvick ................ G08B 5/36 340/584 |
| 2012/0312030 | A1 * | 12/2012 | Lu ........................... F25B 21/02 62/3.6 |
| 2013/0008182 | A1 * | 1/2013 | Hrudka ................... F25B 21/04 62/3.6 |
| 2013/0285831 | A1 * | 10/2013 | Sanders ................ H04W 52/02 340/870.01 |
| 2014/0070943 | A1 * | 3/2014 | Breed .................... E05F 15/43 340/539.11 |
| 2014/0150466 | A1 * | 6/2014 | Boarman ................ F25B 21/02 62/3.63 |
| 2014/0216069 | A1 * | 8/2014 | Koivuluoma ............ F24F 3/14 62/56 |
| 2014/0313055 | A1 * | 10/2014 | Warkentin ............... H04Q 9/00 340/870.16 |
| 2015/0108839 | A1 * | 4/2015 | Annavajjhala ......... H02J 7/35 307/28 |
| 2015/0120602 | A1 * | 4/2015 | Huffman .............. G06Q 10/083 705/339 |
| 2015/0192475 | A1 * | 7/2015 | Eisenstadt ............... G01K 1/02 340/870.17 |
| 2015/0199863 | A1 | 7/2015 | Scoggins et al. |
| 2015/0285541 | A1 | 10/2015 | Borchers et al. |
| 2015/0330657 | A1 * | 11/2015 | Kates ..................... F24F 11/006 165/208 |
| 2015/0355036 | A1 * | 12/2015 | Giorgi ................. H04L 12/2825 702/130 |
| 2017/0108261 | A1 * | 4/2017 | Broussard ............ F25D 11/003 |
| 2017/0198949 | A1 * | 7/2017 | Ilercil ....................... F25B 21/04 |
| 2017/0292761 | A1 * | 10/2017 | Dade ........................ F25D 13/04 |

* cited by examiner

FIG. 13

DEPLOYABLE TEMPERATURE CONTROLLED SHED WITH REMOTE MANAGEMENT

CROSS REFERENCE TO RELATED APPLICATIONS

This application claims the benefit of U.S. provisional patent application 62/257,936, filed Nov. 20, 2015 and titled "Deployable Cold-Shed with Remote Management," the disclosure of which is hereby incorporated by reference in its entirety.

FIELD

The disclosed technology pertains to a system for providing a deployable cold storage shed with remote management capabilities.

BACKGROUND

Recent estimates by trade and development agencies estimate that 25-40% of fruits, vegetables, dairy, and other perishable goods produced within many countries are wasted due to lack of adequate storage and cold chain facilities. This is especially true in countries and regions where infrastructure is rudimentary or unreliable or temperatures are extremely high, as producers of the goods may not have access to a functioning root cellar, electrical infrastructure that can sustain refrigeration, or the ability to freeze perishables. Even in areas where the electrical infrastructure can support the high power consumption of refrigeration or freezing, a power outage may still result in mass spoilage and may require weeks to address due to the proximity of a particular farm in relation to the closest city electrical infrastructure. In order to minimize spoilage of perishables, farmers must carefully plan harvesting of perishable crops in order to consume or sell them within a brief window of freshness. The difficulty in managing production in relation to such a brief window while also accommodating unexpected weather events or other production issues that might make following a strict harvesting timeline impossible contribute to the estimated 25-40% spoilage rate of perishable goods. This high spoilage rate greatly impacts the wealth of farmers as well as the availability and cost of food in many regions of the world.

In addition to limiting the wealth and production of farmers, lack of refrigeration options in remote areas with limited infrastructure also impacts the availability of other goods and services. For example, many vaccines and medicines are sensitive to temperature changes and can have a reduced efficacy if they are stored at temperatures outside of their ideal range.

What is needed, therefore, is an improved system for providing robust refrigeration options (including a remote management capability) that can be deployed in areas with little or no infrastructure.

BRIEF DESCRIPTION OF THE DRAWINGS

The drawings and detailed description that follow are intended to be merely illustrative and are not intended to limit the scope of the invention as contemplated by the inventor.

FIG. 13 is a screenshot of an exemplary interface for managing various configurations of a remote cold-shed.

DETAILED DESCRIPTION

Figure 1:
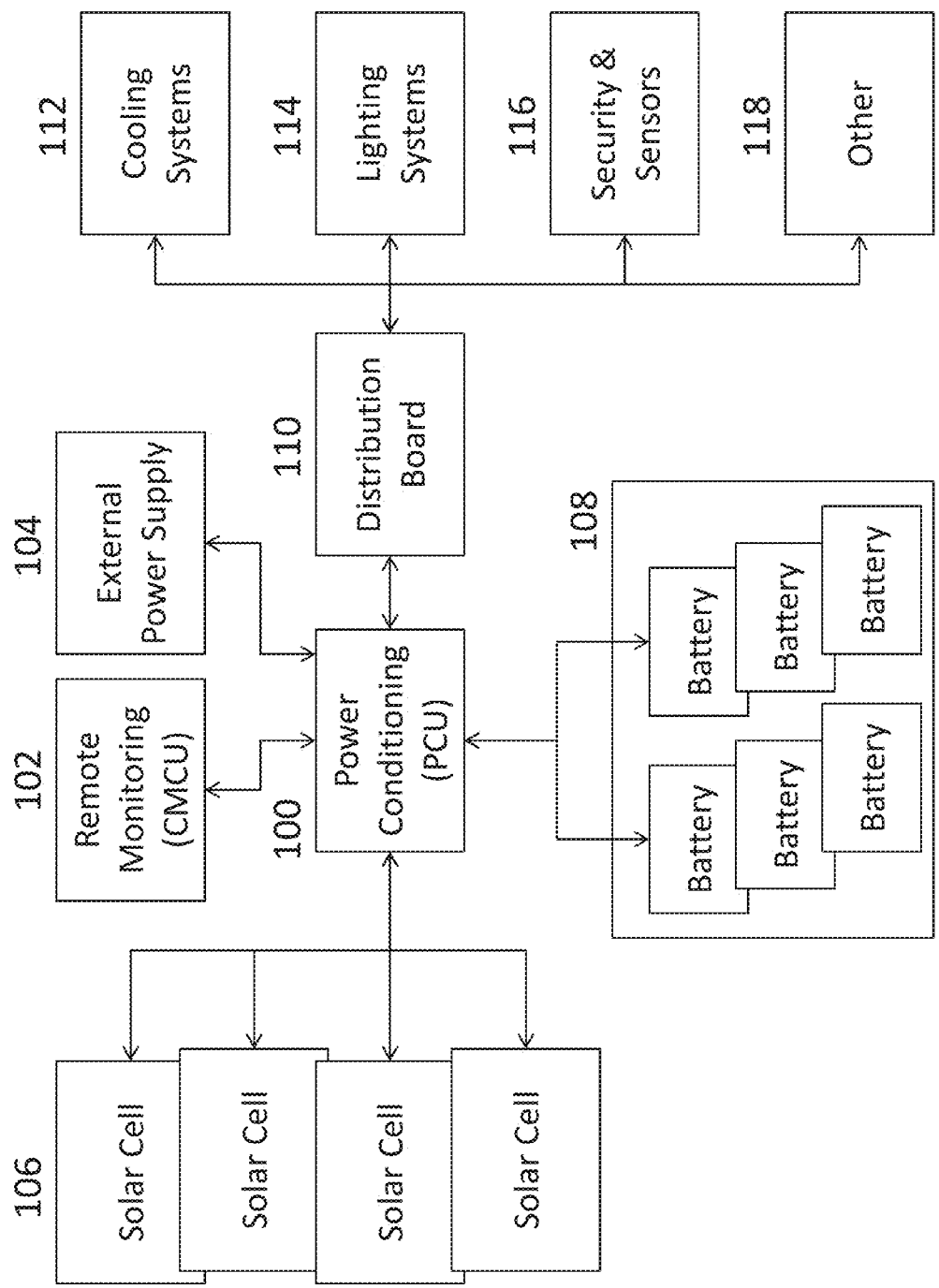
FIG. 1 is a schematic diagram of an exemplary system configured to provide deployable cold storage with remote management

The inventor has conceived of novel technology that, for the purpose of illustration, is disclosed herein as applied in the context of a deployable hot, cold, or temperature controlled storage shed with remote management. While the disclosed applications of the inventor's technology satisfy a long-felt but unmet need in the art of cold storage sheds with remote management, it should be understood that the inventor's technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

I. Exemplary System for Remote Monitored Temperature Controlled Storage

The cold-shed monitoring and control unit (CMCU)(102) in some embodiments may be a modular component of a cold, hot, or temperature controlled shed that allows local and long distance monitoring and control of the system with alerts and notifications. Such example of a cold, hot, or temperature controlled shed may be found in U.S. patent application Ser. No. 14/439,331, filed Apr. 29, 2015 and titled "Solar Power Thermally Conditioned Space," the disclosure of which is hereby incorporated by reference in its entirety. CMCU (102) is supported by an app for displaying the data on a smart phone and other mobile devices in a user-friendly manner, giving owners information along with the ability to monitor one or many cold-sheds remotely. This device is unique because it may be implemented specifically for the cold-shed and is affordable, efficient, reliable, secure, and user friendly. This cold-shed platform is a first of its kind for providing such features as refrigerated storage space for agricultural, dairy, vaccines, and/or medicines at the point-of-production or use where conventional power sources are unavailable, expensive, and/or unreliable for operating a refrigeration system. In some embodiments, the cold-shed is a totally self-contained solar powered refrigerated storage system capable of achieving general interior temperatures as low as 4° C. (39° F.), and potentially even lower when implemented with multi-zone temperature controls. In some embodiments, it has been designed to be the first link in deployable cold-shed infrastructure, making cold storage available right at the farm level where critical time is currently lost before fresh produce or dairy can be chilled to preserve freshness. In some embodiments, it has also been designed to be a mobile but secure solar-powered pharmacy that can be placed at the point of application in remote locations.

The innovative solar power delivery system in some embodiments of a cold-shed can provide power to run the cooling system during sunlight hours, as well as over 24 hours of uninterrupted power to maintain continuous refrigerated storage in the absence of sunlight. The interior is lighted and easy to clean and maintain. In some embodiments, there is easy access through a lockable front door that allows for quick movement of products in and out of the cold-shed. In some embodiments, built into the cold-shed is a non-refrigerated, lockable equipment storage compartment in the back that houses all of the components of the power delivery system except the solar panels, which are mounted on the roof. This storage compartment also allows secure access to the electrical components, including an installed CMCU (102).

As an example of how the technology disclosed below may be used, a farmer may deploy a plurality of cold-sheds in convenient locations near harvestable goods. As workers harvest goods, they are placed in a cold-shed, which may be configured to provide near freezing refrigeration powered by solar cells. The cold-shed, configured with the CMCU (102), may generate a notification to the farmer based upon one or more situations. The farm owner (at a remote location away from the farm) may receive the notification via a phone text message, email, or application alert on his/her phone. Viewing the notification, the farm owner realizes that one or more of his cold-sheds needs attention. The farm owner can view additional information via the application, and may view a summary screen with a report of one or more of the farmer's cold-sheds, either individually or in a group view or list view. The cold-shed in need of attention may be marked or flagged to help narrow the search. The farm owner may view the particular shed for more detailed data, as well as messaging indicating the particular problem with the shed, which may be a temperature alert, low battery voltage alert, low solar current alert, open door alarm, smoke alarm, or similar indicator. The owner or authorized manager may revise one or more settings of the cold-shed in an attempt to address the problem remotely, and then may confirm and send the changes to the cold-shed electronically. While deployment within a food production setting such as a farm is one potential use for the cold-shed with remote management that many examples may focus on, it should be understood that the technology disclosed herein may be applied to a variety of applications such as chemical storage, pharmaceutical storage, storage of temperature sensitive electronics, or other items which may benefit from monitored and reliable temperature controlled storage that may be temporarily or permanently deployed in a remote area with limited infrastructure or even within a city where connecting to available infrastructure is not desirable.

Turning now to the figures, FIG. 1 shows a schematic diagram of an exemplary system configured to provide deployable cold storage with remote management. A power conditioning unit (PCU) (100) serves to provide power management to one or more other devices located in the cold-shed. A cold-shed monitoring control unit (CMCU) (102) provides remote monitoring capabilities to one or more mobile devices in communication with the CMCU (102), and is also in communication with the PCU (100) so that settings of various other systems may be changed in response to commands from a mobile device. An external power supply (104) may be present in some embodiments, and may be an electrical infrastructure, a backup generator, or other power source that may serve as a backup or secondary power source in the event that solar power provided is not sufficient. A plurality of solar cells (106) are placed proximate to the PCU (100) and provide free, renewable power to the PCU (100). A plurality of batteries (108) are charged by the PCU (100) as solar energy is received, and provide current back to the PCU (100) to provide power for other components. A distribution board (110) is connected to the PCU (100) and provides clean reliable power from the PCU (100) to one or more additional devices, such as cooling systems (112), lighting systems (114), security devices and sensors (116), or other attached devices (118), which may include microphones, cameras, pressure and weight sensors, infrared sensors, motion and vibration sensors, gyroscopic sensors, wind speed and wind direction sensors, or other similar sensors or devices that may be placed in or on a cold-shed in order to provide additional information and management options.

Figure 2:
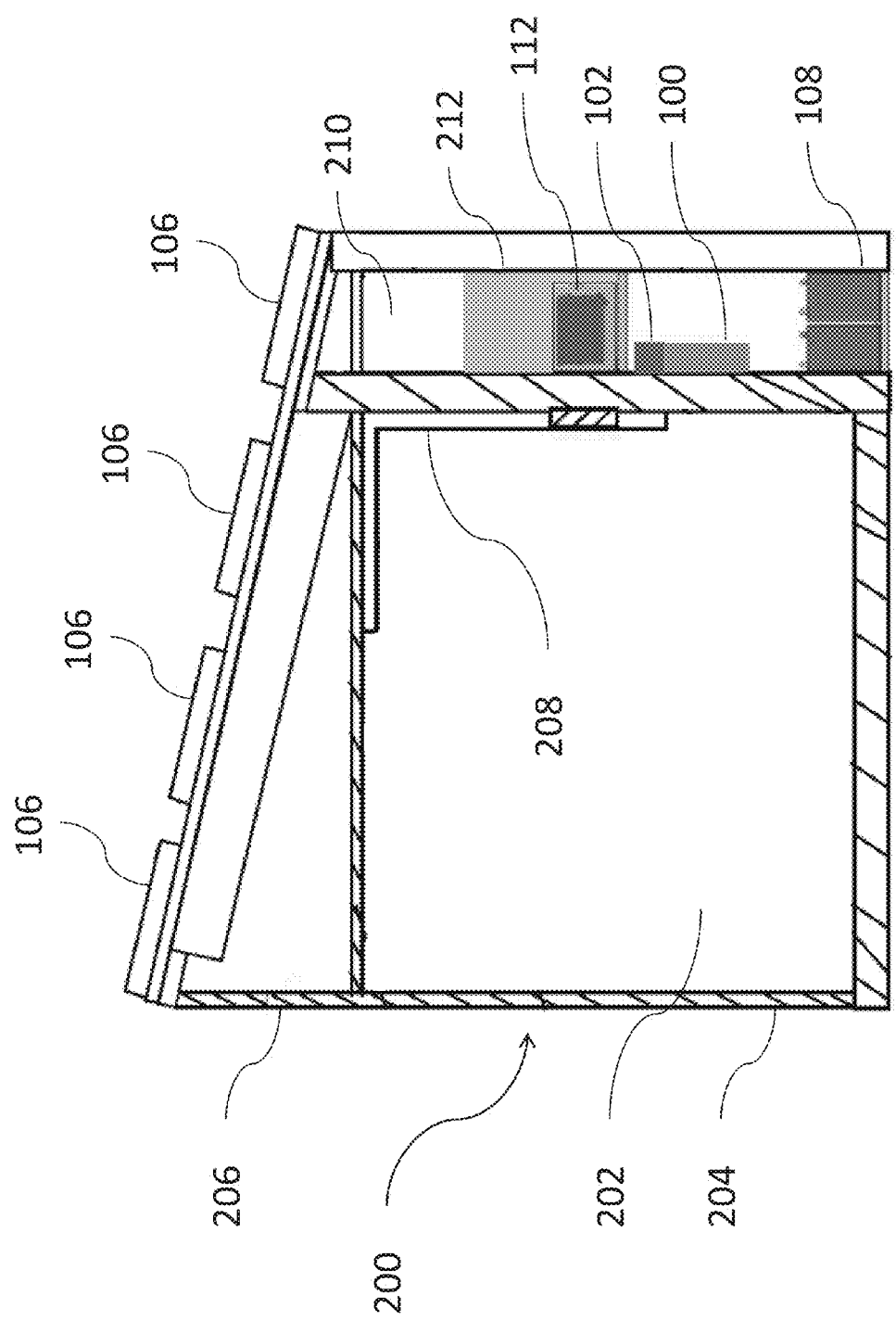
FIG. 2 is a side elevation, cross section view of an exemplary cold storage shed.

Turning now to FIG. 2, that figure shows a side elevation, cross section view of an exemplary cold storage shed. The pictured shed (200) has three major areas, a cold storage area (202), a utility room (210), and a roof section (206). The cold storage area (202) may be a compartment of variable size, and may have insulated interior and exterior walls (204) to assist in maintaining temperatures despite sun and exterior temperatures. The cold storage area (202) may be accessed by a door or hatch, and may also have an air circulation port (208) for exchanging warmer air for colder air. The cold storage area (202) door may also be insulated, and may be secured by a magnetic door lock or other automated locking mechanism, and may, in some embodiments, also have an automatic door opener or closer to allow remote opening and closing of the door, as well as a door position sensor to allow remote detection of whether the door is open or closed. While referred to as a cold storage area, it should be understood that this area (202) is not restricted to use only for cold storage, as it is essentially an insulated compartment which may aid in efficiently maintaining a range of desired internal temperatures. Thus, the cold storage area (202) may be configured to maintain perishable goods at below ambient temperatures with a cooling device, or may be configured to maintain perishable goods at near room temperature for the storage of preserved goods, or may even be configured to maintain temperatures above ambient temperatures with the aid of a heating device for the storage of goods in extremely cold ambient temperatures. Thus, references to a cold storage area within this disclosure are for the sake of example and discussion only, and should not be considered as a limitation of the technology.

The roof section (206) may be a static surface to which a number of solar panels (106) are attached. As with the cold storage area (202), the roof may be heavily insulated against solar and convection heat. In some embodiments, the roof section (206) may be automated by way of one or more pushrods that can be used to adjust the angle of the solar panel mounting surface relative to the sun. In this manner, an adjustable roof section can be initially configured for maximum solar exposure for a particular area, or may be manually or automatically adjusted throughout the day to maintain maximum solar exposure for the solar panels (106). In some embodiments, the roof section (206) may include additional systems such as pushrods or robotic gimbals allowing one or more of the solar panels (106) to be pushed, pulled, or rotated about one or more of its axes in order to change the orientation of the face of the solar panel (106) relative to the sun. With such additional components, a CMCU (102) or other processing device could be configured to receive information indicating current solar input to a panel (106) at a current orientation and determine, based on this input and other factors such as weather, date, time, year, or historic solar input data, a subsequent orientation.

Using automated rods or gimbals, the solar panels (106) could then be adjusted to the subsequent orientation, and solar input could be again sampled to determine if solar input had improved to expected levels as a result of the change in orientation. Alternately, the CMCU (102) could be configured, based upon a geographic location of deployment and a date, time, and year, the point that the sun is estimated to be at and gradually adjust the position of the solar panel (106) in order to maximize exposure to the sun. Other variations exist for devices and methods that could incorporate active solar panel (106) automated sun tracking, with such variations being apparent to those of ordinary skill in the art in light of the disclosure herein. In some embodiments, automated rods or gimbals may also be used to change the orientation of a solar panel or solar cell in response to adverse weather conditions or other occurrences. For example, if a wind speed sensor or weather forecast information indicates that wind speeds currently exceed or may exceed a safe wind speed limit for the solar panel, the CMCU may be configured to automatically change the orientation of the automated solar panel mount to place it at an angle horizontal to the shed or even tucked against the shed or tucked behind a protective barrier around the shed roof to prevent heavy winds from pushing against a large surface area of the panel and damaging or displacing it. Similarly, if precipitation sensors, impact sensors, or weather forecast information indicates snow or hail, which could damage or cover the solar panel and prevent normal function, the solar panel may be oriented at an angle vertical to the shed, so that hail or snow does not directly strike and collect on a large surface area of the panel.

The utility room (210) may be a secured, ventilated room that contains most of the active components of the shed (200). The utility room shown contains the batteries (108), the PCU (100), the CMCU (102), the cooling systems (112), ventilation and insulation (212) for the cooling system (112), and cabling, connectors, and wiring for interconnecting the devices. The utility room (210) may also be accessed by a door or hatch, the door or hatch also having a magnetic or automatic locking mechanism and, in some embodiments, an automatic door opener or closer, and sensors for sensing the position of the door. The utility room (210) may be secured against forced entry, weather, and other outside forces through insulation, waterproofing, and metal plating, as it contains many costly components. The utility room (210) may not be cooled by the cooling system (112) as the cold storage room (202) is, but in some embodiments the utility room (210) may be insulated against solar heat, and ventilated to remove convection heat generated by electrical components stored therein.

Additional components that may be placed in or on the shed (200) include, for example, weight sensors placed in the cold storage area (202), on the floor or in one or more shelves, bins, or barrels, that can report the weight of goods stored therein, weight sensors placed under the shed (200), infrared or optical sensors placed on the interior or exterior of the shed (200) and used to detect motion or the presence of humans or animals near the shed (200), or cameras or microphones used to capture video and audio in the interior or exterior of the shed. Further components may include a vibration sensor or motion sensor configured to detect attempts to move the shed (200), a gyroscopic sensor to detect orientation of the shed (200) and detect shifting or sinking, a GPS sensor to provide location data of the shed (200), humidity sensors, biological contaminant sensors for detecting mold or other contaminants, smoke and heat detectors and alarms, one or more thermometers placed in various places in and around the shed (200), and similar sensors, security systems or components, and devices that may be useful in a particular embodiment or implementation.

Figure 17:
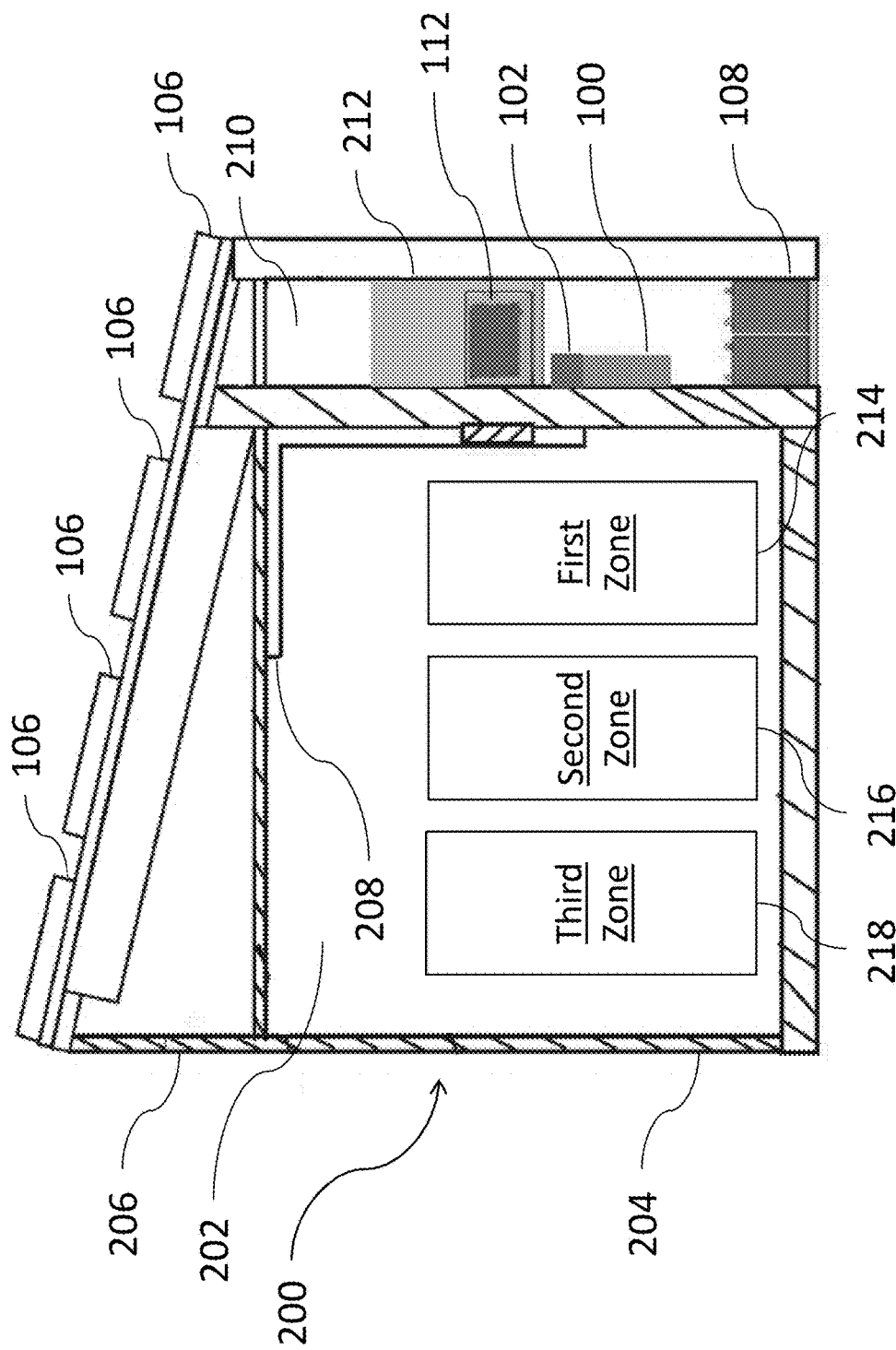
FIG. 17 is a side elevation, cross section view of an alternate exemplary cold storage shed having multiple zones within.

Variations and other additional components may be added to a storage shed such as that shown in FIG. 2 and FIG. 17 in order to make it suitable for a particular implementation or purpose. For example, in embodiments where ease of mobility is desirable, the underside of the shed (200) may be fitted with a passive loading system, such as a receiver for a fork lift or lift points for a winch or crane, or another part of the shed (200) may be fitted with an active loading system such as a jack or winch that could be used to aid in loading the shed (200) onto the bed of a truck or other cargo carrying vehicle. In yet other embodiments where ease of mobility is desirable, the shed (200) may be fitted with a towing receiver and wheels, allowing it to be hitched to a vehicle and pulled along some terrains. In such an embodiment, the wheels may be semi-permanently fixed to the shed (200) and could be disabled with a locking mechanism to disable the axle or wheel, or could be removable from the shed (200) during deployment in order to prevent unwanted movement of the shed (200), or could be immobilized with an electric braking system controlled by a CMCU (102), such that the wheels could be locked or unlocked remotely if necessary. In yet another embodiment, the shed (200) could be built into the bed of a cargo vehicle such as a truck or van and configured to operate independently of the vehicle's systems or electronics. Other variations on mobile sheds exist and will be apparent to one of ordinary skill in the art in light of the disclosure herein.

Figure 3:
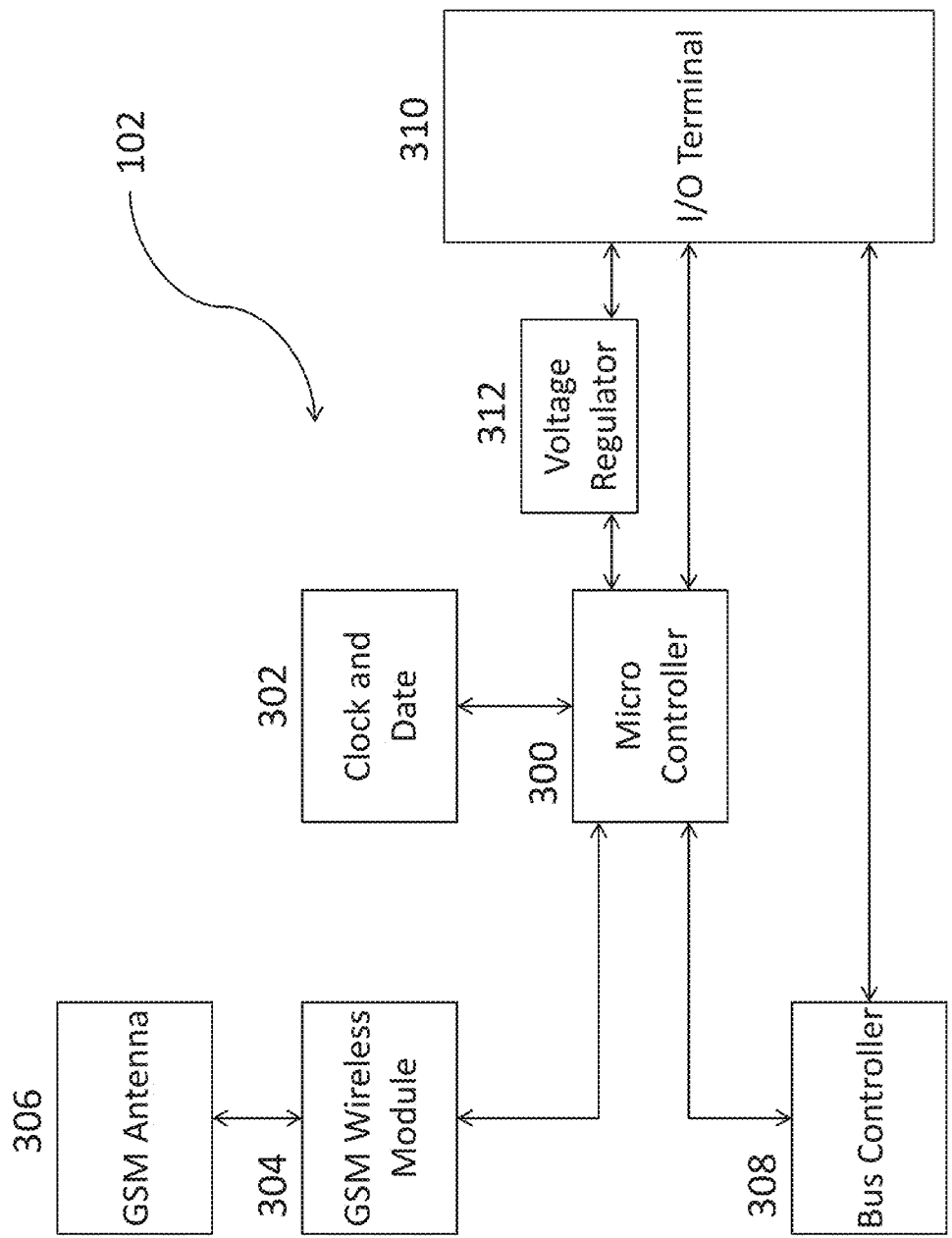
FIG. 3 is a schematic diagram of the components of an exemplary monitoring unit.

Turning now to FIG. 3, that figure shows a schematic diagram of the components of an exemplary monitoring unit. A CMCU (102) is a modular component of the system.

It could be pre-installed at the time of delivery of a cold-shed or it could be installed later by the owner of a cold-shed. The CMCU (102) shown in FIG. 3 has a microcontroller (300) and time and date (302) unit, to allow processing of data, management of timed and scheduled notifications, and communication with other components of the CMCU (102). The microcontroller (300) may be, for example, a high Performance/Low Power Atmel 8 Bit AVR RISC/Based Microcontroller which combines 64 KB ISP flash memory with read/write compatible 2 KB EEPROM, 4 KB SRAM, 53 General Propose I/O line, and 32 general-purpose working registers, or another processor with adequate processing power and capabilities. A wireless remote-monitoring data card (304) is responsible for communication between the CMCU's (102) controller (300) and a power conditioning unit (PCU) (100). The GSM antenna may be, for example, an antenna providing operation at both GSM Quad band frequencies with +2 DB Gain, or a similar antenna as may be required for a particular wireless functionality in an embodiment. An input/output module (310) includes an RS485 card (308) and a voltage regulator (312) along with conversion of analog data to digital for display. The bus controller (308) may, for example, be an RS485 Data Bus protocol, which is used for getting the electrical data from PCU (100) and the refrigeration data from the digital controller module connected to the compressor/condenser/evaporator unit (112) of the cold-shed.

This GSM/GPRS module may be connected to the I/O unit with a single USB connection and gets all the information from that unit and displays it on smart phones using standard cellular signals and configured with the appropriate application. Examples of the GSM/GPRS (304) may, for example, be Wireless module Sim900, which works in Quad Band GSM/GPRS 850/900/1800/1900 MHz. This component delivers low power-consumption performance for voice, SMS, and data communications. In various other embodiments, the wireless module may be, for example, a Bluetooth receiver, Wi-Fi module, optical communicator, radio receiver, or other similar device allowing wireless communication. When connected, the application may run on all types of mobile devices and can be used to monitor and control one or many cold-sheds. Other GSM/GPRS data signals received and sent by the system may include refrigerator temperature data, time and date, solar voltage and current, inverter voltage and temperature, battery voltage and current, door position sensors, exhaust temperature, grid voltage current, and temperature controller.

FIG. 3 also shows how the I/O Terminal Block (310) interacts with the RS485 module (308) and the controller (300). This schematic diagram also illustrates how various modules within CMCU (102) communicate with each other and with the mobile phone app. The I/O Terminal Block (310) may include terminals for sensors or devices enabling or sensing door position, door locking magnets, fire alarms, battery voltage, solar voltage, refrigerator temperature, inverter voltage and current, grid voltage and current, battery current, solar current, ambient temperature, and other similar capabilities and data. Bus Controller (308) may be configured to collect various analog signals from one or more connected devices. For example, signals collected may include solar voltage between 0 and 48 volts, solar current between 0 and 50 amps, battery pack voltage from 0 and 48 volts, battery pack current between 0 and 50 amps, inverter temperature between 0 and 60 centigrade, inverter outgoing voltage between 0 and 230 volts, grid voltage between 0 and 230 volts, grid current between 0 and 50 amps, refrigerator actual temperature between 0 and 40 centigrade, and similar signals and ranges as may be desirable in a particular embodiment of this technology.

Bus controller (308) output may include a signal to set temperature of a cooling unit (112) to a range between 4 and 16 centigrade, activate or deactivate a lower power consumption mode, activate or deactivate a fan, turn a cooling unit (112) display on or off, and similar signals that may be required to operate or modify the operation of the cooling unit (112) in a particular embodiment. Other signals received by the bus controller (308) may include exhaust temperature for a cooling unit (112) or utility room, ambient temperature in one or more locations within the cold-shed, fire alarm sensor, such as a 3 terminal smoke and heat detector with an audible and/or visual alarm indicator, a signal indicating whether a cold room or utility room door magnet is closed and secured, as well as signals causing a door magnet to release or lock.

Figure 4:
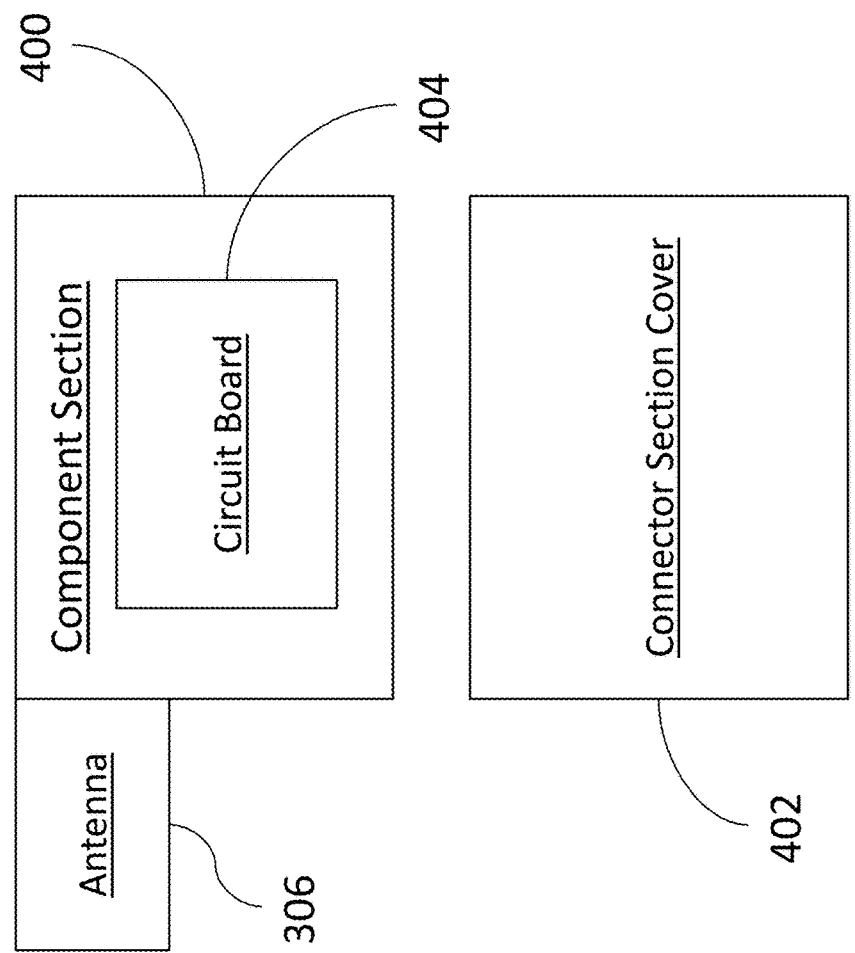
FIG. 4 shows a schematic diagram of an exemplary monitoring unit with a circuit board section exposed.
Figure 5:
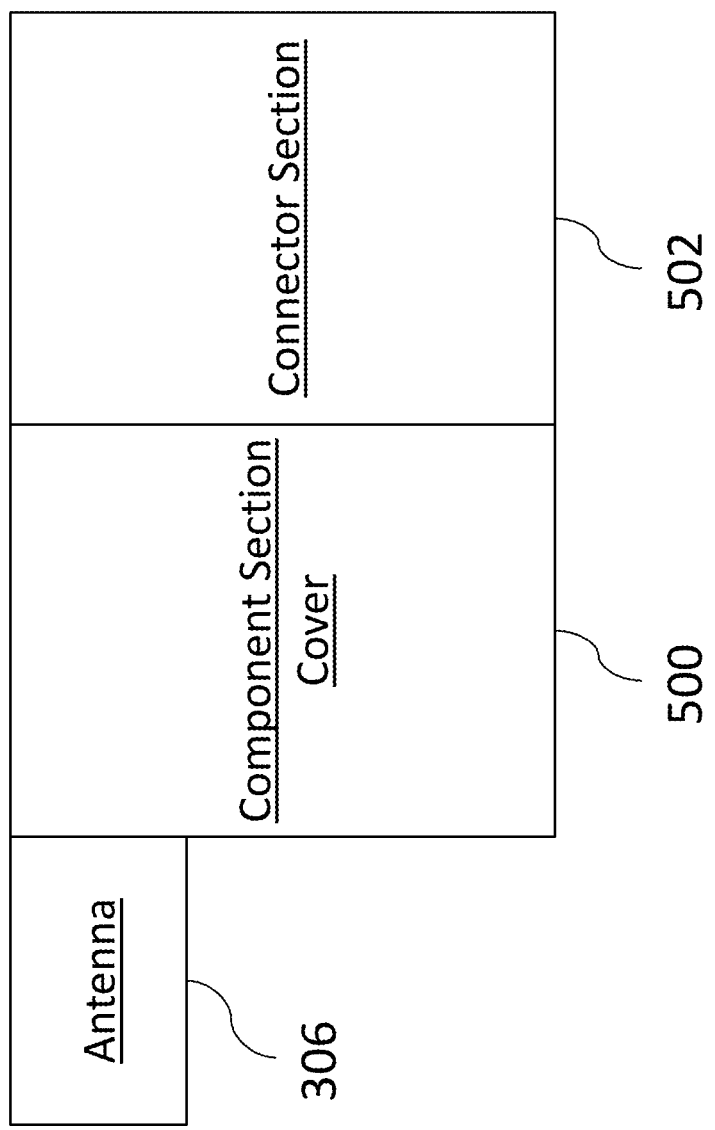
FIG. 5 shows a schematic diagram of an exemplary monitoring unit with an electrical connection section exposed.

Turning now to FIG. 4, that figure shows an exemplary monitoring unit with circuit boards exposed. The monitoring unit may have a hardened plastic or metal case, and may in some embodiments be waterproof, shockproof, fireproof, or may exhibit other resistances and tolerances as may be desired. A component section (400) may be covered with a plastic cover when in use, but is shown with no cover in FIG. 4. A circuit board (404) is securely placed within the component section (400). The circuit board (404) may embody the components described in the context of FIG. 3, as well as additional capabilities as may be desirable in a particular implementation, such as backup power sources, external storage devices, external cooling or ventilation devices, and other similar capabilities. An antenna (306) extends outwards from the case and is adjustable to achieve maximum broadcast and transmission from the wireless module (304). A connector section cover (402) is shown in place. FIG. 5 shows the exemplary monitoring unit of FIG. 4 with a component section (400) cover (500) in place, and a connector section cover (402) removed to expose a connector section (502). The connector section (502) may contain a number of inputs and outputs for connecting external devices or power supplies to components within the component section (400).

Figure 6:
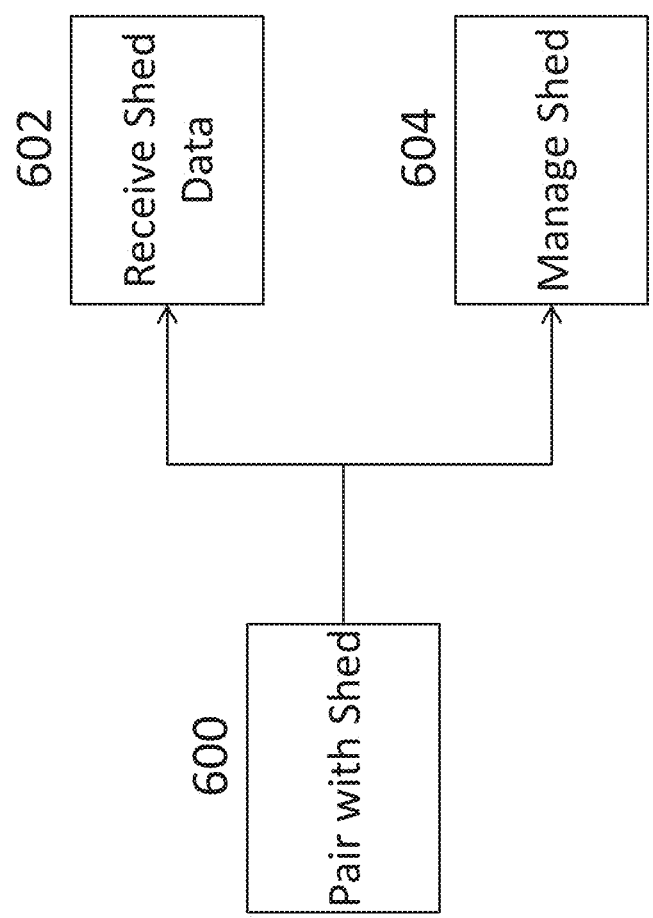
FIG. 6 is a flowchart of a set of exemplary high-level steps that a system could perform to allow remote management of the system.

II. Exemplary Methods and Interfaces for Remote Monitored Temperature Controlled Storage Turning now to FIG. 6, that figure shows a flowchart of a set of exemplary high-level steps that a system could perform to allow remote management of the system. A CMCU (102) may be installed with the cold-shed and paired with the shed and one or more mobile devices that may be configured to manage the shed operations (600). The exact method of pairing and configuring the CMCU (102) with the shed may vary by the particular hardware and wireless communication method used. For example, in the case of a GSM cellular communication method, after installation of the CMCU (102) within the cold-shed, a user may insert the mobile SIM card in the mobile device to be used. The application may be installed and opened, and a user may add one or more mobile device numbers to the CMCU (102) for mobile devices that may be used to manage cold-shed operations or view cold-shed data. Varying levels of registered user may exist, such as a read only mode for viewing certain data without making changes, a manager mode that is able to view and change settings, or similar configurations. When first registering and identifying manager or other users, the mobile phone may send commands via short message service (SMS) to CMCU (102) to confirm registration and provide security challenges. Once a mobile phone is paired with a shed (600) the mobile phone may be used to receive (602) various data associated with the shed as well as manage (604) various attributes associated with the shed, as will be explained in more detail below.

Figure 7:
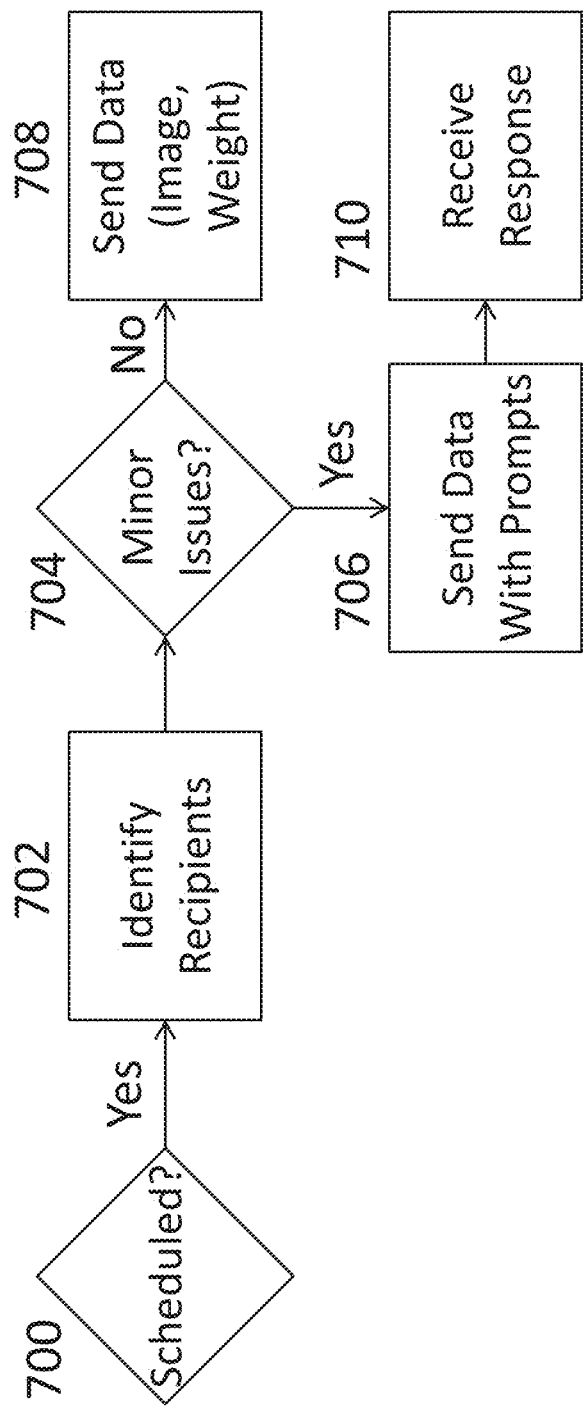
FIG. 7 is a flowchart of a set of exemplary steps for providing scheduled notifications to a remote system manager.

Turning now to FIG. 7, that figure shows a flowchart of a set of exemplary steps for providing scheduled notifications to a remote system manager. These steps, as well as those shown in FIGS. 8 and 9, may be performed by software instructions that are stored and executed by the CMCU, by a separate computer within the shed that is in communication with the CMCU via a short range wired or wireless communication, or by a remotely located server that is in communication with the CMCU via a long range wireless capability. For ease of discussion only, the following explanations and examples will suppose that the CMCU stores and executes the instructions and data required to perform the steps of FIGS. 7-9.

The system may be configured to perform a number of scheduled notifications and tasks for communicating data and information that is not so critical to require an immediate notification. For example, the system may be configured to deliver an hour-by-hour summary of temperature every 24 hours. When the system determines that an event is scheduled (700), the system may identify a set of contacts or recipients (702) that are to receive the scheduled notification. The particular recipients may be configured separately for each scheduled notification. For example, a first set of recipients may receive data every 24 hours, while a second set of recipients may receive the same data or a different set of data once a week. The system may then determine if there are any minor issues (704) that exist and should be included in the notification. If no issues exist (704), data may be sent (708) to the recipients. Sent data may include, for example, temperature status, battery status, shed contents status, door status, images or videos of the interior or exterior of the shed, or other data generated by the sensors and devices of the shed. If there are minor issues detected (704), the system may send data to the recipient as above, but may also include information on the minor issues as well as prompts (706) to allow a recipient to take action and address the minor issues. For example, if the system detects that a battery is not charging as quickly as expected, the system may identify this as a minor issue (704). When the system sends temperature and battery status to a recipient, the system may also send information notifying the recipient about the failing battery, as well as a possible solution (706). The data and prompt may be received by the recipient in the form of text and graphics viewed via a graphical user interface of an application running on the recipient's device, or may be received via a text message or other two-way communication. In the scenario above, a recipient may receive a text message or email stating "Battery failure, switch to back up battery? Respond with (Y) or (N)." By responding to the text message the recipient can cause the CMCU to receive the response (710) and then either perform the proposed action or do nothing. In the above example, when the recipient responds with a "YES" or "Y", the CMCU may receive the response (710) and switch over to a backup battery. Alternately, the same could be performed via an application graphical user interface configured to execute on a recipient device, with the user receiving prompts via graphics and text and responding within the same interface. The steps above may also be performed on demand in response to a request via an application graphical user interface or text message, as opposed to being performed only on a configured schedule.

Figure 8:
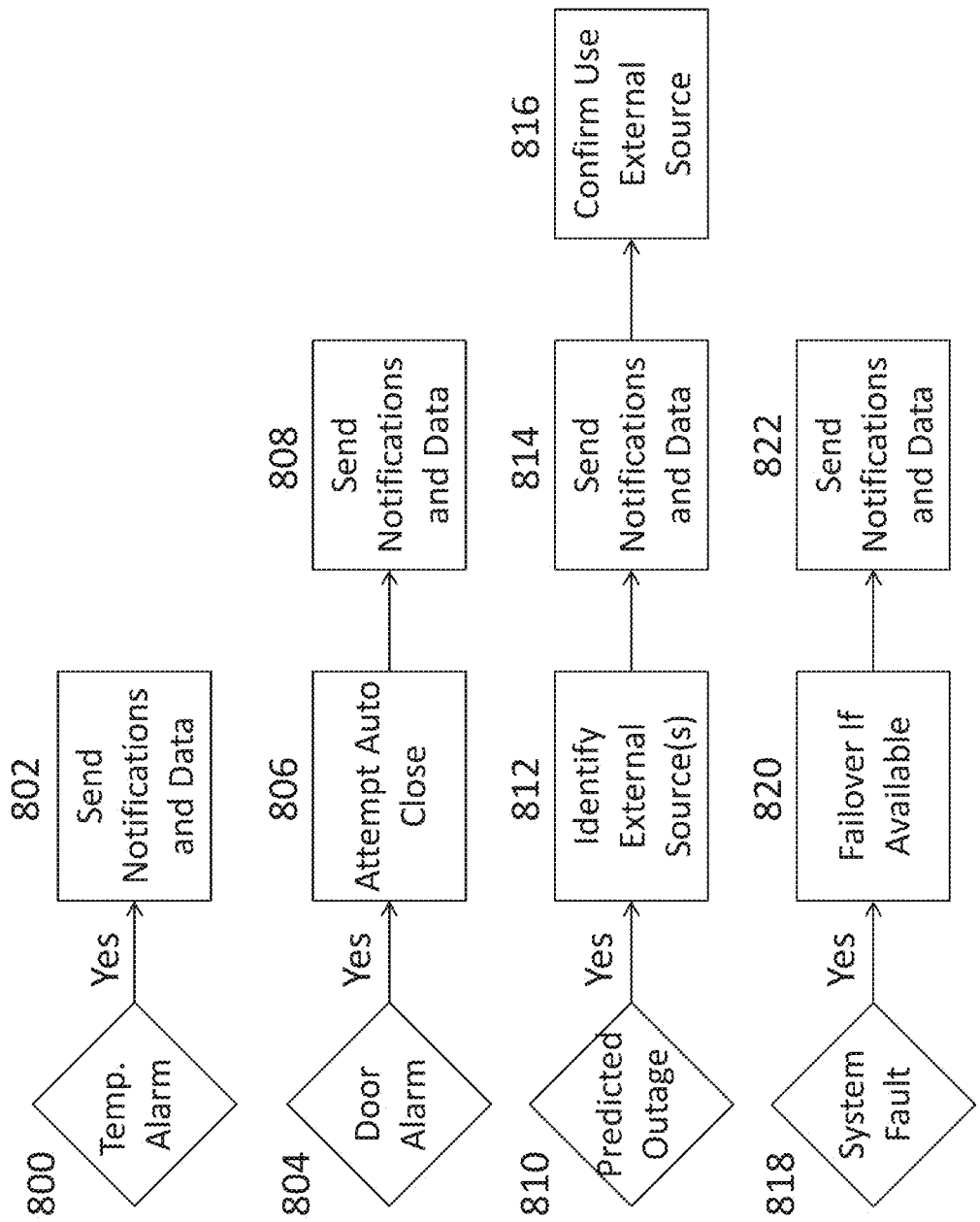
FIG. 8 is a flowchart of a set of exemplary steps for providing a variety of triggered notifications to a remote system manager.

Turning now to FIG. 8, that figure shows a flowchart of a set of exemplary steps for providing a variety of triggered notifications to a remote system manager. These notifications may be of a higher priority than the minor issues that may be handled during scheduled notifications. These notifications are exemplary of the types of notifications the system supports and thus is not an exhaustive list, as may be apparent to one of ordinary skill in the art in light of this disclosure. As with scheduled notification, each notification may be configured to be sent to a particular set of recipients. One configured alarm may be a temperature alarm. When an internal temperature exceeds or fails to reach a configured threshold (800) an immediate notification may be sent (802) identifying the current shed interior temperature, current exterior temperature, or other information that may assist a recipient in determining whether further action is required. In this manner, a farmer may receive a notification letting him know that a cold-shed internal temperature has exceeded 45 degrees Fahrenheit, and that external temperature that day is above 100 degrees Fahrenheit. The farmer may conclude that, due to the extreme ambient heat, the cold-shed internal temperature is higher than usual. Similarly, if internal temperatures are rising in the absence of other factors, the farmer may conclude that some other problem exists and decide to inspect the cold-shed in person.

Another configured alarm may be a door alarm. When a door position sensor or latch magnet indicates that a door, whether the cold room door or utility room door, is ajar or otherwise not secured (804) the system may attempt to automatically close the door (806), in embodiments having a door closer, and may send a notification (808) to one or more recipients identifying which door is not secured, how long the door has been unsecured, the last person to open the door using a personal key code or access card, and other information that may help a recipient address a currently unsecured door or prevent future unsecured doors. The notification may additionally include whether an automatic door closer was able to automatically close the door (806) so that even where a door is automatically closed the recipients can still be aware that the door was left unsecured at some point.

Another configured sensor may be a predicted outage alarm. Based upon current weather information, such as temperature, sunlight, and precipitation data gathered by sensors proximate to the shed, as well as forecasted weather data that may be delivered to the system via a wireless data connection, the system may be configured to predict for a several day period the electricity that may be generated by the solar cells, as well as the electricity that may be required to maintain the configured temperature. For example, if the system currently detects that solar cells are generating 1000 watts of power, and that due to high external temperatures the system is consuming 950 watts to maintain the configured internal temperature, there may be no alert. However, if the system additionally receives weather forecast information indicating that within the next 24 hours the weather may become overcast, without a reduction in external temperatures, the system may determine that it is likely to only generate 500 watts of power for an extended period of time while still requiring 950 watts to maintain current internal temperatures. In this scenario, the system may identify (812) any external power sources that may be available, such as additional solar panels, additional batteries, external power generators, or external electrical infrastructure, and then send a notification to recipients (814) indicating the predicted power shortage and proposing the use of one or more external power sources to address the shortage. The system may then receive (816), via an application configured on the recipient device or via text message response, a confirmation from a recipient that the system should use an external power source if the prediction is determined to be accurate. In this manner, the owner or authorized manager could make a decision on whether to use potentially more expensive external power sources to maintain a configured temperature through upcoming weather conditions that make complete reliance on solar power impossible. Alternately or in addition to the above, the system may also generate a notification explaining the energy shortfall, and proposing an internal temperature increase that may be sufficient to allow the system to operate despite reduced solar generation.

Another configured alarm may be for general system faults. For example, any loss of power, loss of communication, or loss of sensor data from a device or component of the system may be detected (818) and, if available, a failover device may be used instead (820). Whether a failover device is available or not (820), the system may then send notifications to recipients identifying the particular component that is faulty (822), and whether a failover device was available and is now functioning as a backup. In this manner, a farmer or a healthcare worker may receive a notification indicating that a cooling unit has failed, but that a backup cooling unit was available and is now operating instead. Other alarms that may be configured may depend upon the particular sensors and devices available for a particular implementation or embodiment. For example, alarms may be configured to activate based upon a motion sensor sensing motion during particular time periods, a change in weight indicating that contents have been added to or removed from the cold storage, sensed vibrations or GPS data indicating that a shed is being moved, and other similar scenarios.

As one merely illustrative example, a plurality of cold-sheds may be distributed across many acres of farmland or an entire remote region. Each cold-shed may be configured to communicate with the owner's user device and the authorized manager's user device. The owner might be located hundreds of miles away from the farmland or remote region, while the manager might be more locally situated. Each cold-shed of the plurality of cold-sheds may be equipped with a fire alarm, and the CMCU may be configured, when a fire alarm detects smoke at the interior or exterior of the cold-shed, to send text message alerts to the owner, the authorized manager, as well as a local fire response unit identifying the particular cold-shed from which the alarm originated by a unique identifier, a description, and a geographic location. This text message alert could, in some embodiments, be accompanied by an image captured by a camera proximate to the cold-shed, to aid in identifying false alarms. In this manner, when smoke is sensed, the owner may be notified so that he or she may follow up with the authorized manager once the alarm has been addressed, the manager might be notified so that he or she can proceed to the location of the cold-shed and address the source of the smoke, and the local fire response unit might contact the manager or proceed to the location to provide more specialized assistance in addressing the source of the smoke. Such a configurable system of alarms, where different parties may be given different information depending upon different roles, reduces the chance that individual alerts will be ignored for including too little or too much information, as each party may be ensured that they are receiving information tailored to their desired response to the alarm.

Figure 9:
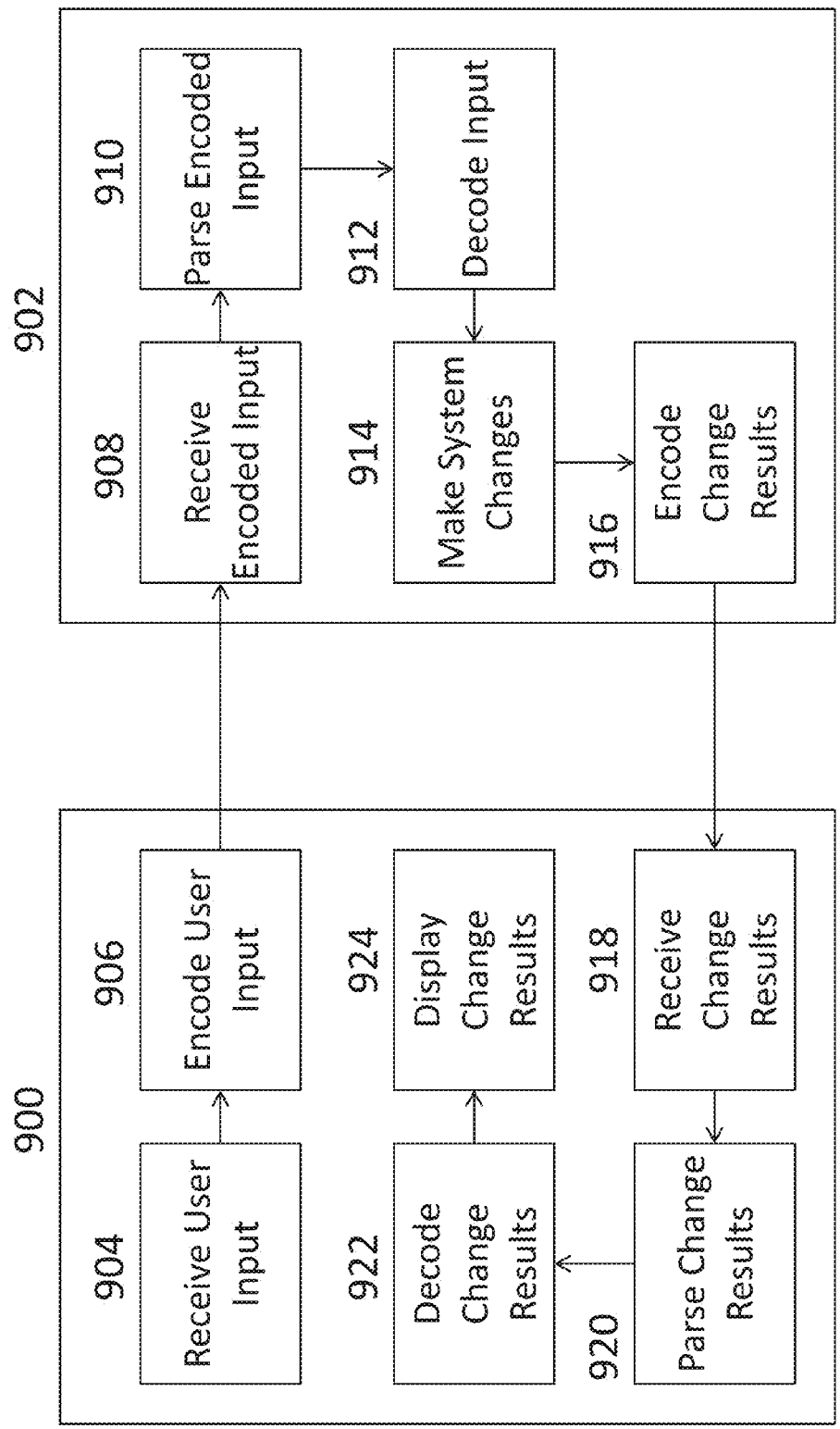
FIG. 9 is a flowchart of a set of exemplary steps for making changes to a system based upon data received from a remote system manager.

Turning now to FIG. 9, that figure shows a flowchart of a set of exemplary steps for making changes to a system based upon data received from a remote system manager. A user device (900) may be a computer, mobile phone, tablet, or other similar computing device that is capable of processing, sending, and receiving information from a shed device (902), which may itself be a computer, mobile phone, tablet, CMCU (102), or other device located proximate to the shed itself. The user device (900) and shed device (902) may communicate through text message, email message, or other similar two way electronic communication method, or may communicate through data transmissions generated by an application graphical user interface configured to execute on the user device (900). Since the user device (900) and shed device (902) may in many instances be relying on limited bandwidth communication methods, such as text messaging, EDGE, 2G, 3G or other cellular data communication in areas that have unreliable wireless infrastructures, it may be advantageous to encode data before each transmission regardless of its origin. For example, the user device (900) may receive a user input (904) via the graphical user interface of an application. This input may then be encoded by the user device (900) to a minimal transmission size, such as one or several bytes of binary data in the case of a direct transmission via GSM or wireless data, or a string of one or more ASCII character in the case of a transmission via text message. In either case, and as an example only, the first binary octet of a data transmission may identify a particular device from a mapping of devices available to both the user device (900) and shed device (902), and the second octet may indicate one of a number of messages, actions, faults, or other similar and predictable messages, with the second octet mapping also being available to the user device (900) and shed device (902). In this manner, an exchange of several bytes between the two locations can convey significant data about the devices and conditions of the shed.

Once the user input is encoded, the user input may be transmitted via one or more available communication types to be received by the shed device (908). Received input may be parsed (910) to identify individual commands or inputs from a string of commands, and to compare the inputs to an encoding table to determine the meaning and intended result of each command (912). Once the shed device (902) has determined the individual commands that have been received, the shed device (902) may make one or more system changes (914) according to the received inputs. This may include, for example, adjusting the refrigeration temperature, locking or unlocking a door, disabling an alarm, gathering information from one or more sensors, or other similar changes that may be available depending upon the installed device configurations and sensors. Once the shed device (902) has attempted to make the changes (914), results of the changes may be compiled, encoded (916) according to the shared device/action encoding tables described above, and transmitted to the user device (900) to be received (918) by the user device (900). Once received (918), the change results may be parsed to identify discrete messages (920), decoded (922) using the shared device/action encoding tables, and displayed (924) via an application graphical user interface or text message by the user device (900).

As an example of how this process might be performed, a farmer or a healthcare worker may open an application on his or her mobile phone (900) and select an option to unlock a utility room door in order to allow a proximately located technician to inspect the batteries. The mobile phone (900)

receives this input and encodes it according to an encoding table (906). This input might be encoded into a two byte string, such as for example "01101001, 00100001." This two byte string may then be transmitted via cellular data network, or may be converted to two ASCII characters "i!" and transmitted via text message, and received (908) by the shed device (902). Once received (908), the encoded command may be parsed (910) to determine that there is only one command, and decoded (912) using a mapping table to identify "01101001" as being associated with the utility room door, and "00100001" as being associated with an unlock command. The shed device (902) may then send a signal to the magnetic latch of the utility room door to cause it to unlatch the door (914). The doors unlocked status may be confirmed via a door position sensor or magnetic latch sensor, and a change confirmation message may be encoded (916) such as "01101001, 00100100" or "i$" and then transmitted and received (918) by the mobile phone (900) via cellular data or text message. Once received (918), the encoded message may be parsed to determine there is only one message (920), decoded (922) to determine that "01101001" is associated with the utility room door and that "00100100" is associated with a successful change of the last received command. The mobile phone (900) may then display (924) a confirmation that the utility room door was unlocked successfully via the application graphical user interface, or via text message, email, or other similar two way communication.

Figure 10:
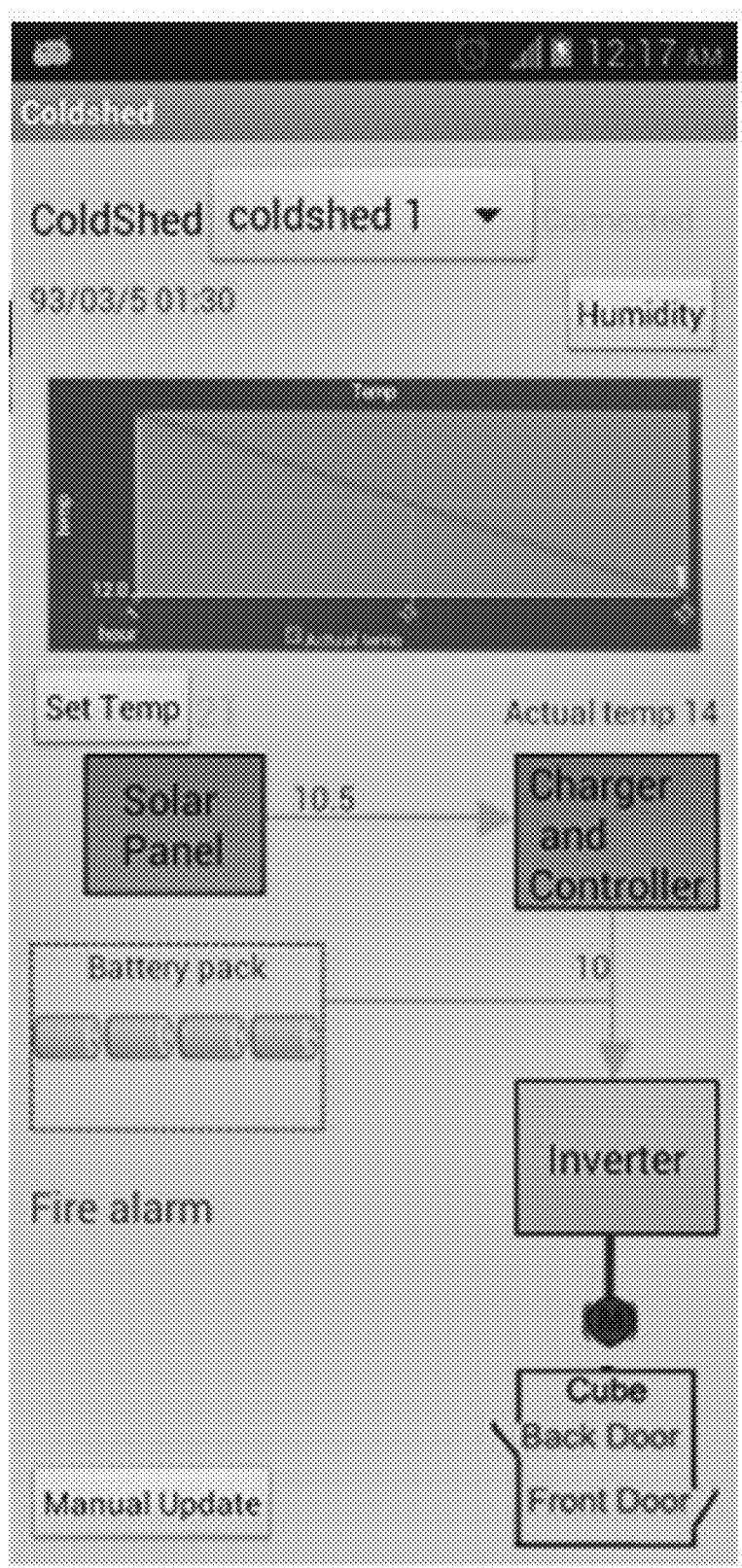
FIG. 10 is a screenshot of an exemplary interface for viewing and managing a remote cold-shed.
Figure 11:
FIG. 11 is a screenshot of an exemplary interface for adjusting the temperature of a remote cold-shed.
Figure 12:
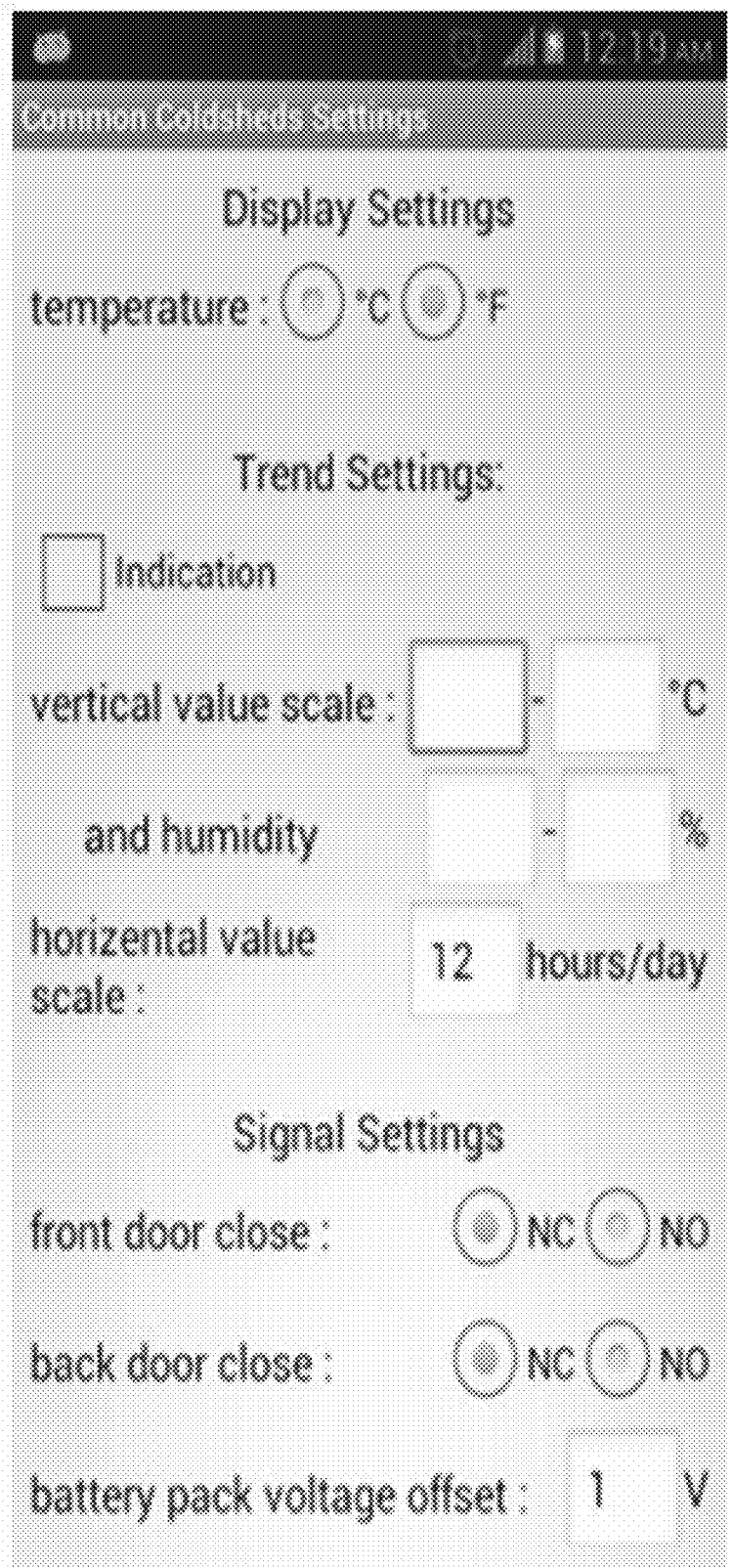
FIG. 12 is a screenshot of an exemplary interface for managing various configurations of a remote cold-shed application.
Figure 13:
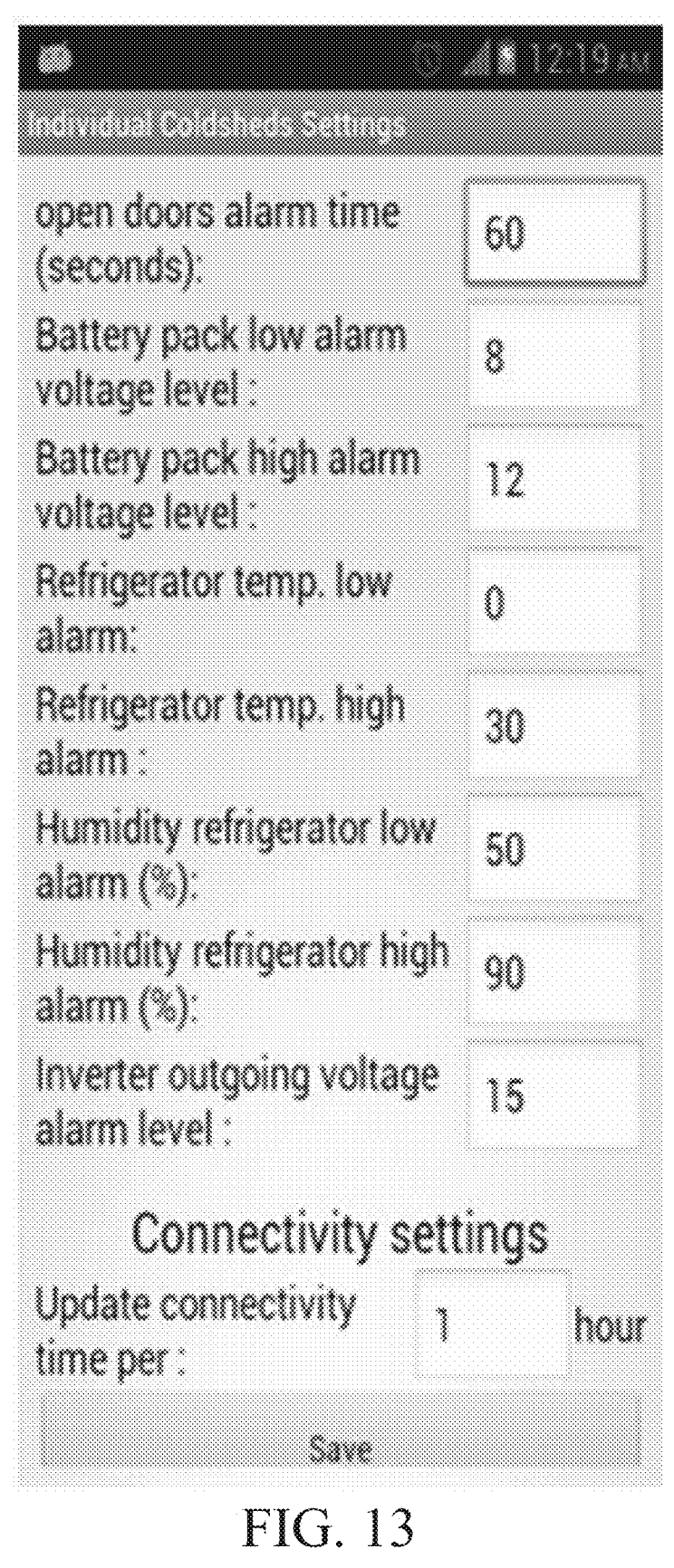

Turning now to FIGS. 10-13, those figures show screenshots of exemplary interfaces of an application graphical user interface executed and displayed on a user device (900). The application for the device can display cooling temperatures, alarms for fire and open-door, incoming and exhaust air temperatures, humidity level, inverter incoming and outgoing voltages, solar panel voltages and total wattage, and many other system parameters. It also allows for remote adjustment of the refrigerator temperature. The control box is connected to the refrigeration components and the PCU (100) for the purpose of reporting critical information via a phone app and controlling some functions remotely. FIG. 10 shows an interface providing a selection box for selecting a particular cold-shed from a list of configured cold-sheds, a graph of important data such as temperature over a prior period of time, information on electrical systems such as the solar panels, batteries, and power conditioner, and a door status indicating whether doors are opened, closed, or secured. FIG. 11 shows an interface providing a text box for adjusting the temperature that a particular cold-shed will attempt to maintain. FIG. 12 shows an interface for configuring various user options of the application itself, such as temperature displays, graph displays, door alarm, and voltage settings, etc. FIG. 13 shows an interface providing various configurable alarm and threshold data for each cold-shed being managed by the application, such as door alarm time, battery pack voltage alarms, temperature alarms, humidity alarms, inverter alarms and data connectivity refresh time periods, and similar settings.

While the discussion above has generally focused on the relationship between a single user device and a single cold-shed, it should be understood that the disclosed technology is not restricted to a one to one relationship between the two. For example, a single cold-shed may be managed by a multitude of user devices, a single user device may be used to manage a multitude of cold-sheds, and a multitude of user devices may be used to manage a multitude of cold-sheds. As an example, in one embodiment of the technology, a farm owner user device, a farm manager user device, and a farm worker user device may be in communication with a plurality of cold-sheds, and provide various disclosed management and administrative features to each of the user devices for each of the cold-sheds individually or as a whole. For example, a farm owner user device may adjust the temperature for a plurality of sheds simultaneously, or each single shed individually. Likewise, a farm manager user device may be configured to receive messages and alerts from a plurality of sheds simultaneously, to allow for effective management of large farms with multiple sheds. Such further variations and configurations of user devices in relation to cold-sheds will be apparent in light of this disclosure.

III. Exemplary System for Multi-Zone Temperature Management and Monitoring

One additional aspect of the remote monitoring and temperature control technology disclosed herein is multi-zone temperature management and monitoring. An embodiment of the disclosed technology using multi-zone temperature management could be useful for many contexts, including for the storage of produce and perishable foods where some fruits or vegetables might desirably be stored at one temperature, while dairy goods or meats might be stored at a different temperature or even frozen. Another useful embodiment of the multi-zone technology could be to provide remote monitoring and temperature control for medicines, vaccines, and other medical goods.

Most medicines and medical goods should be stored in a cool, dry, dark and secure environment. With these requirements, the above disclosed cold shed remote management technology provides the ability to monitor temperature, light, access, and humidity via a remote user device such as a smart phone, and address issues relating to those metrics by adjusting the operation of related devices such as cooling systems (112) to control temperature and humidity, lighting systems (114) to control exposure to light, and security and sensor devices (116) to control access. Multi-zone cooling and management may include additional features to support two or more different temperature controlled zones, in addition to one or more other cold-shed remote management features. This could be useful where, for example, some medicines may preferably be stored at temperatures between 59 and 77 degrees Fahrenheit, while vaccines may preferably be stored at temperatures between 36 degrees and 46 degrees Fahrenheit. Blood supplies and other donated tissues or fluids may preferably be stored at much lower temperatures, even below freezing in some cases. With a variety of items that may be stored in a cold-shed with temperatures ranging from below freezing to as high as 77 degrees, a single zone cooling system may not be ideal.

Figure 14:
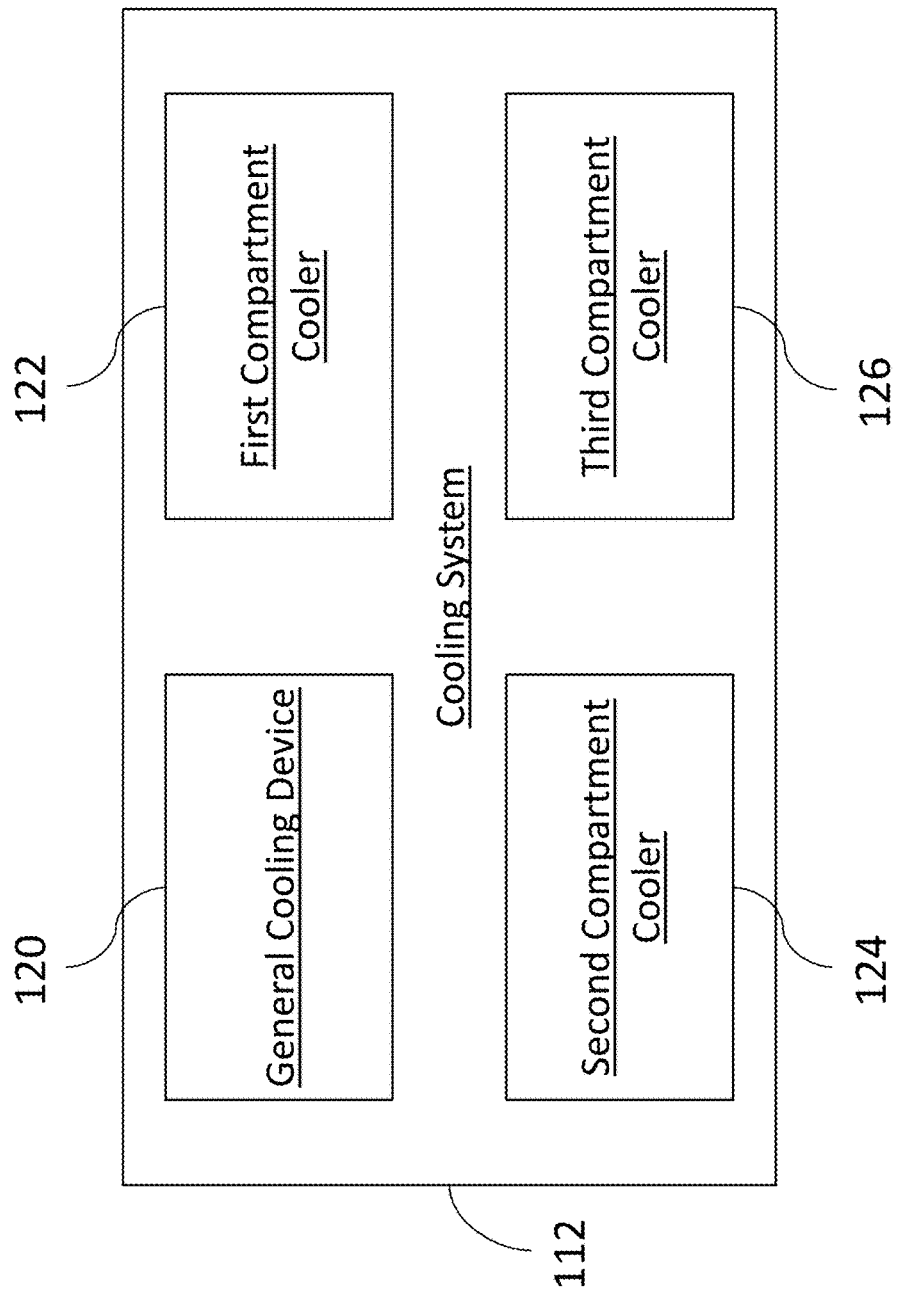
FIG. 14 is a schematic diagram showing components that may be included in a heating, cooling, or temperature management system.

In embodiments implementing multi-zone monitoring and temperature control, the cold storage area (202) may have two or more compartments for the storage of items having different temperature requirements. One compartment may be the general storage area (202) itself, while a second compartment may be a sealed storage container within the general cold storage area (202). For the sake of example, suppose a cold storage area (202) contains three separate compartments or zones. In such a case, the cooling systems (112) may have separate cooling devices for each zone or compartment. FIGS. 14 and 17 show such an embodiment, with cold storage area (202) containing multiple compartments (214, 216, 218) and cooling system (112) having a general cooling device (120) and three compartmental cooling devices (122, 124, 126). The general cooling device (120) and compartmental cooling devices (122, 124, 126)

may be similar or different cooling devices, depending upon such factors as desired cost, size, robustness, and use of a particular implementation. Cooling devices may include evaporative coolers, vapor-compression coolers, absorption refrigeration coolers, heat sinks, thermoelectric coolers, liquid coolers, or other types of heat pumps or heat exchangers. For example, some embodiments may include a vapor compression device as the general cooling device (120) which cools the entire interior of the cold storage area (202), while each compartment (214, 216, 218) may have its own dedicated vapor compression device (122, 124, 126) which cools the interior of that single compartment. In this manner, the multi-zone compartments (214, 216, 218) each benefit from the general cooling device's (120) cooling of the cold storage area (202), while also being able to cool an individual compartment (214, 216, 218) to a different desired temperature by configuring a compartmental cooling device (122, 124, 126) for the desired temperature.

One advantageous embodiment may be to have the general cooling device (120) be a conventional refrigeration device such as a vapor compression cooling device, and the compartmental cooling devices (122, 124, 126) each be thermoelectric cooling devices, with a cold side positioned within the compartment (214, 216, 218), and a hot side venting or conducting heat to the utility room (210), to the outside air, to an exhaust chamber, or to a ground surface such as earth or water. In this manner, the general cooling device (120) may cool the cold storage area (202) to a first temperature, perhaps 65 degrees Fahrenheit, while the first compartmental cooler (122) may reduce the temperature in a first compartment (214) from 65 degrees to 43 degrees Fahrenheit, a second compartmental cooler (216) may reduce the temperature in a second compartment (216) from 65 degrees to 35 degrees Fahrenheit for storage just above freezing, and the third compartmental cooler (218) may reduce the temperature in a third compartment (218) from 65 degrees to 0 degrees Fahrenheit for below freezing storage. Such differences can be achieved by adjusting the size of the compartments, the size of the thermoelectric coolers, and the power inputs to the thermoelectric coolers. Such an embodiment may be advantageous for storage of medical goods including medicines, vaccines, blood samples or blood supplies, tissue samples, and other items due to the variety of temperature zones available. Thermoelectric coolers (122, 124, 126) may be advantageous in this embodiment due to the precision at which temperatures may be maintained, a reduced need for circulating cooled air within a potentially tightly packed compartment, their durability and simplicity leading to a simple integration with storage compartments, and the ability to move heat to a hot side outside of the cold storage area (202) with minimal supporting structure or devices. Thermoelectric coolers offer the additional advantage that by reversing the polarity of the applied power, which creates the Peltier effect, they can produce heat or remove heat from an area. This offers the possibility to heat or cool a compartment in order to maintain careful control over internal temperatures, which may be desirable for the storage of items like vaccines where both upper and lower temperature thresholds are important.

Some embodiments of the exemplary cold-shed system shown in FIG. 17 and others like it may have additional types of security devices and sensor devices (116) in order to support multi-zone temperature monitoring and storage features, or to support additional functions in other configurations and implementations. Such additional security devices and sensor devices (116) may include access control and auditing for the cold storage area (202), as well as separate access control and auditing for each compartment (214, 216, 218). While such features may not be as desirable for a cold-shed intended to be used for general storage of product or perishable foods, such devices may be desirable for a cold-shed such as that shown in FIG. 17 that may be used for the storage of medical goods and items, or other temperature sensitive or costly items. For example, in a configuration intended for the storage of medicines, vaccines, strong pain killers, and other medical items, a CMCU (102) or another local processing and storage device may store a list of authorized users for each area of the cold-shed which has access control, such as the cold storage area itself (202) as well as each individual compartment (214, 216, 218). The list of authorized users could be regularly updated from a user device or other remote server via the CMCU's (102) wireless communication capabilities. Some users may be authorized for access to the cold storage area (202) via a passcode, identification card scanner, wireless fob scanner, mobile phone or smart device application, or other device, but may be prevented from bypassing similar restrictions on any of the compartments (214, 216, 218) within the cold storage area (202). This could allow them to access bandages, sterile water, mild pain killers such as ibuprofen and acetaminophen, and other low risk items stored at mild temperatures.

Other users may, in addition to being authorized to access the cold storage area (202), also be authorized to access one or more of the compartments (214, 216, 218) via a smart badge, passcode, fob, or other access device. In this manner, if one compartment (214) stores vaccines, only users who are authorized to administer vaccinations may be granted access to that compartment (214) and all others will be prevented from access by an automated locking mechanism. Similarly, a second compartment (216) storing powerful pain killers or narcotics may have access restricted to a small group of people who administer such medications, and so on. By allowing for multi zone controlled access and monitoring, different levels of access can be granted to different zones to prevent theft and misuse of expensive or high risk items by personnel that have no need to access them. Some embodiments may also include auditing features that track each users successful and unsuccessful efforts to access one or more of the areas or zones, and could be paired with notifications to a remote user device, smartphone, tablet, email address, or other electronic communication to notify a manager or administrator of access attempts. These notifications could be additionally paired with images, sound, video, or other information or metrics captured by one or more of the sensor and security devices (116).

In some embodiments enforcing multi-zone access control, the CMCU (102) or another local device could enforce other access controls such as requiring that a door to the cold storage area (202) be closed and secured before allowing a compartment (214, 216, 218) to be accessed, in order to prevent wasteful changes in temperature and humidity due to outside air or humidity. Another access control could be to prevent more than one compartment (214, 216, 218) from being opened at a time in order to preserve their individual temperatures from comingling, preventing any of the areas (202, 214, 216, 218) from being opened outside of scheduled times, preventing repeated access to an area within a certain duration of time, preventing access to an area during certain environmental conditions such as rain or extreme heat, preventing access to an area when the system is struggling to maintain required temperature, humidity, or other environmental conditions, preventing access to an area when battery levels are low or secondary power sources (104) are unavailable, and other similar restrictions. Access control may also include notification and response requirements, such that a request to access an area is delivered to a manager or administrator via a user device as a notification that may be confirmed in order to send a communication signal to the CMCU (102) before access is granted.

In some embodiments of a multi-zone monitored and temperature controlled cold-shed, or in embodiments of a single zone monitored and temperature controlled cold-shed where the functionality is desired, the sensors and security devices may also include inventory management and monitoring devices to aid in tracking items that are placed in an area or zone within the cold-shed. This could include, for example, barcode scanners, QR code scanners, or other imaging devices that may be used to capture a unique visual identifier, wireless scanners such as RFID communicators, NFC communicators, or other short range wireless communication, or by manual entry of identifiers or descriptions for items via a user. In such embodiments, the CMCU (102) may be configured to maintain a list of items that are stored within each of the one or more areas of the cold-shed as well as the periods of time for which they are stored. When a user places an item in the cold storage area (202), he or she may scan a visual identifier on the item or touch the item against a wireless communicator placed proximate to the cold storage area (202) in order to generate a signal to the CMCU (102) indicating that the item has been added to the cold storage area (202). Similarly, if an item is being added to a compartment (214, 216, 218), that compartment may have a dedicated or shared scanner or wireless communicator that may be used to capture a machine readable identifier from the item and associate that item as being stored in one of the compartments. In some embodiments, a wireless communicator may be placed within a compartment such as the cold storage area (202) or another compartment (214, 216, 218) and may periodically scan and identify all items contained within via RFID, NFC, or another wireless communication technology, which could allow for completely automated inventory control. Since each compartment (202, 214, 216, 218) is separate, wireless communication shielding could be used to prevent a scan of the contents of one compartment (214) from detecting items contained within a separate compartment (216).

Using automated, semi-automated, or manual inventory control as described above, a CMCU (102) or another local processing and storage device may store a list of items and times that those items were part of the stored inventory of a zone within the cold-shed. This inventory list may be associated with metrics from one or more of the security and sensor devices (116) so that a timeline can be determined for each individual item indicating the temperature, humidity, light level, vibration level, and other sensor based information at which it has been stored while part of the inventory. This information may be used to determine for each item whether or not it has been stored in a proper environment before its use, and may be used to perform various functions such as providing notifications when an item is reaching a threshold for improper storage that may require it to be discarded, recommending an item to use at any given time based upon its storage history, recommend various changes in storage configurations, temperature and humidity control settings, power consumption, and other cold-shed specific configurations in order to extend the life of a stored item, display information via a user device to a manager or administrator in order to aid in inventory management and procurement, and other actions described in more detail below.

IV. Methods for Monitoring Multi Zone, Access Controlled, and/or Inventory Managed Temperature Control Items Embodiments of a monitored temperature controlled cold-shed which implement configurations and devices to support multi-zone functionality, access control functionality for one or more zones, inventory management of stored items, or any combination of those features may benefit from additional methods of monitoring and management. In addition to functionality that was described above, multi-zone temperature control may be integrated with any of the methods or interfaces shown in FIGS. 6-13 to allow for the management and monitoring of one or more zones within a cold-shed in order to view various metrics gathered by sensors placed within the zone (708), receive notifications or alarms for temperature (800), door access (804), outages (810), system faults, (818), or other notifications, prompts, data sets, and electronic communications that may be transmitted, for example, via a wireless communication device to a user device according to the exemplary steps of FIG. 9 or another communication method, for that particular zone.

Figure 15:
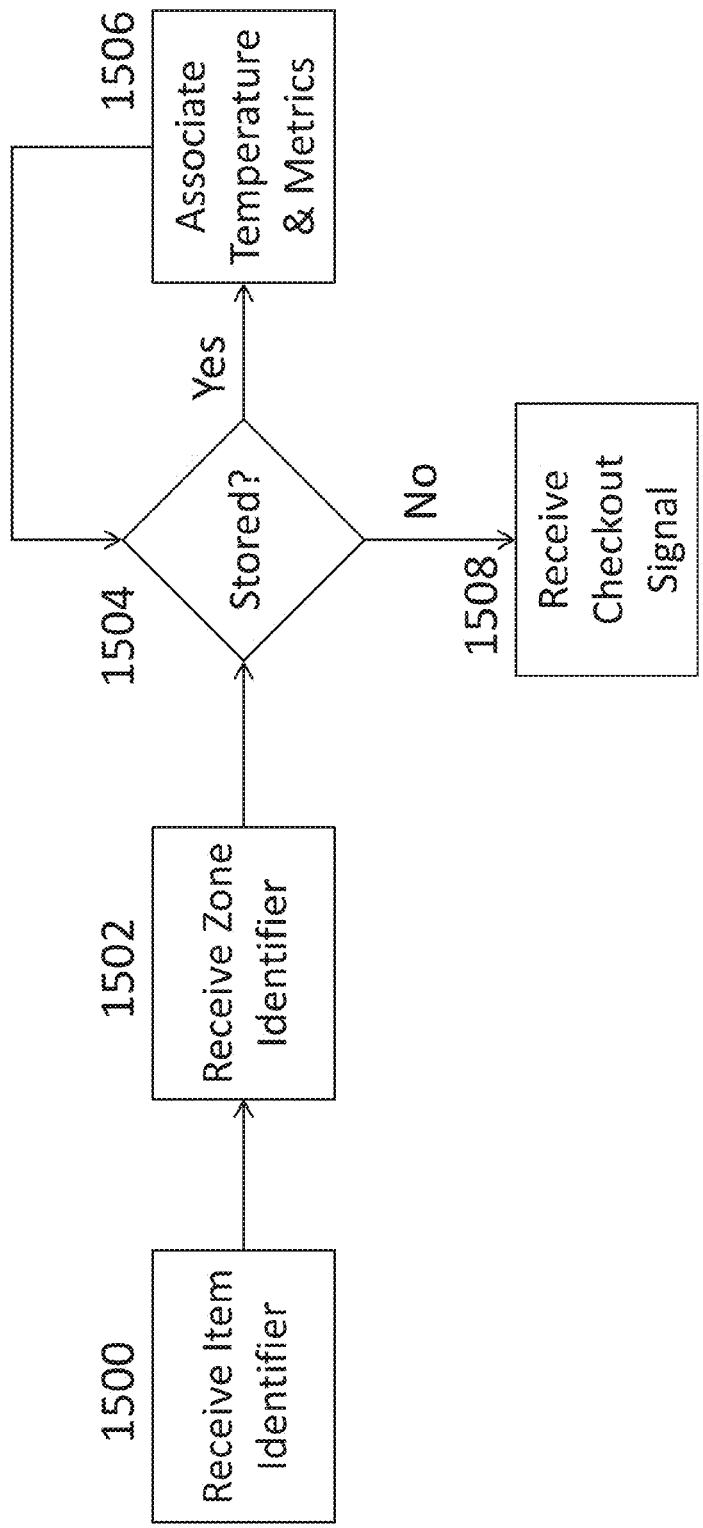
FIG. 15 shows an exemplary set of steps that may be performed by a configured device to manage inventory information.

As further example of steps that may be performed to aid in the monitoring and management of a cold-shed implementing one or more of these features, FIG. 15 shows a set of exemplary steps that may be performed to monitor and manage inventory stored within one or more zones of a cold-shed. The steps of FIG. 15 may be performed by the CMCU (102) or another local device, or may be performed by a remote user device in communication with the CMCU (102), or a combination of the two. An item identifier may be received by the CMCU (102) from a source such as a manual input, a visual identifier scanner, a wireless identifier scanner, or other device which may be used to receive a machine readable identifier or user input identifier. This could include, for example, a scanner reading a barcode or QR code of an item, an RFID or NFC reader reading a wireless communicator attached to an item, or a user input via keyboard or touch screen identifying the item. For embodiments supporting multi-zone temperature control and monitoring, a zone identifier may also be received (1502) indicating the zone which the item is being placed in. The zone identifier could be determined based upon the item identifier, such that if a vaccine item identifier was received the zone would automatically be selected as the zone most appropriate for storage of a vaccine based upon configured temperature, humidity, or other user selection, could be determined based upon zones and identifier devices having a one-to-one relationship such that scanning a barcode via a first or second barcode reader automatically selects a first or second zone, or could be manually input by a user.

Once the item identifier and zone identifier are received, the system may treat the associated item as being stored (1504) until a checkout signal is received (1508). A checkout signal may be in the form of a second receipt of an item identifier for an item that is already stored, and may be received (1508) as a result of that item being removed from the compartment or zone it was placed in and scanned by a visual or wireless scanner, or manually checked out. During the time that the item is stored (1504), various metrics may be collected via the security and sensor devices (116) for the zone that the item is associated with and may be associated (1506) with the item for that time period, with such information being stored locally on the CMCU (102) or another device. Such information may, in some embodiments, also be propagated to a user device or remote server in communication with the CMCU (102). As an example, if a vaccine were scanned via a barcode reader at a first zone (214) within a cold shed, the CMCU would receive (1500) a unique item identifier for that vaccine and a zone identifier (1502) that would identify the item and zone where the vaccine was being placed. While the vaccine is stored in the first zone (214) metrics from sensors associated with that zone would gather and associate data with that vaccine (1506). Gathered data may include measured environmental characteristics for each time period of storage, such as a second, minute, hour or day, and environment characteristics may include, for example, temperature, humidity, lumens or visible light, vibration, or other environmental characteristics that may be measurable and may impact the efficacy of a vaccine. When a user accesses the first zone (214) and removes the vaccine, it is again scanned via the barcode reader causing the CMCU (102) to receive (1508) a check-out signal indicating that the vaccine is no longer stored. Once checked out, the vaccine is no longer associated with data gathered by the sensors (116) until such a time that it might be placed back into storage.

After an item is stored in a zone, the CMCU (102) may continue to maintain a record of that item even when removed, and may flag such "removed" time periods as the item being improperly stored in relation to any temperature, humidity, or visible light requirements, or may associate the item with the ambient temperature as measured by an external sensor of the cold-shed until such a time that it may be checked back in. In this manner, the CMCU (102) is able to create and audit trail for the item where its storage conditions are either known to be proper, or may be known or assumed to be improper for the measured lengths of time. Returning to the example of a vaccine, the CMCU (102) may log information indicating that the vaccine is stored at 41 degrees Fahrenheit for one week, at which time it is removed from the first zone (214) for one hour, and then returned to the first zone (214). Using such information, the CMCU (102) or a user examining data logs may determine that a vaccine which must be stored at between 36 and 46 degrees Fahrenheit, and which loses its efficacy if it is stored outside of that range for more than two to twenty-four hours (depending on temperature), is still usable.

Figure 16:
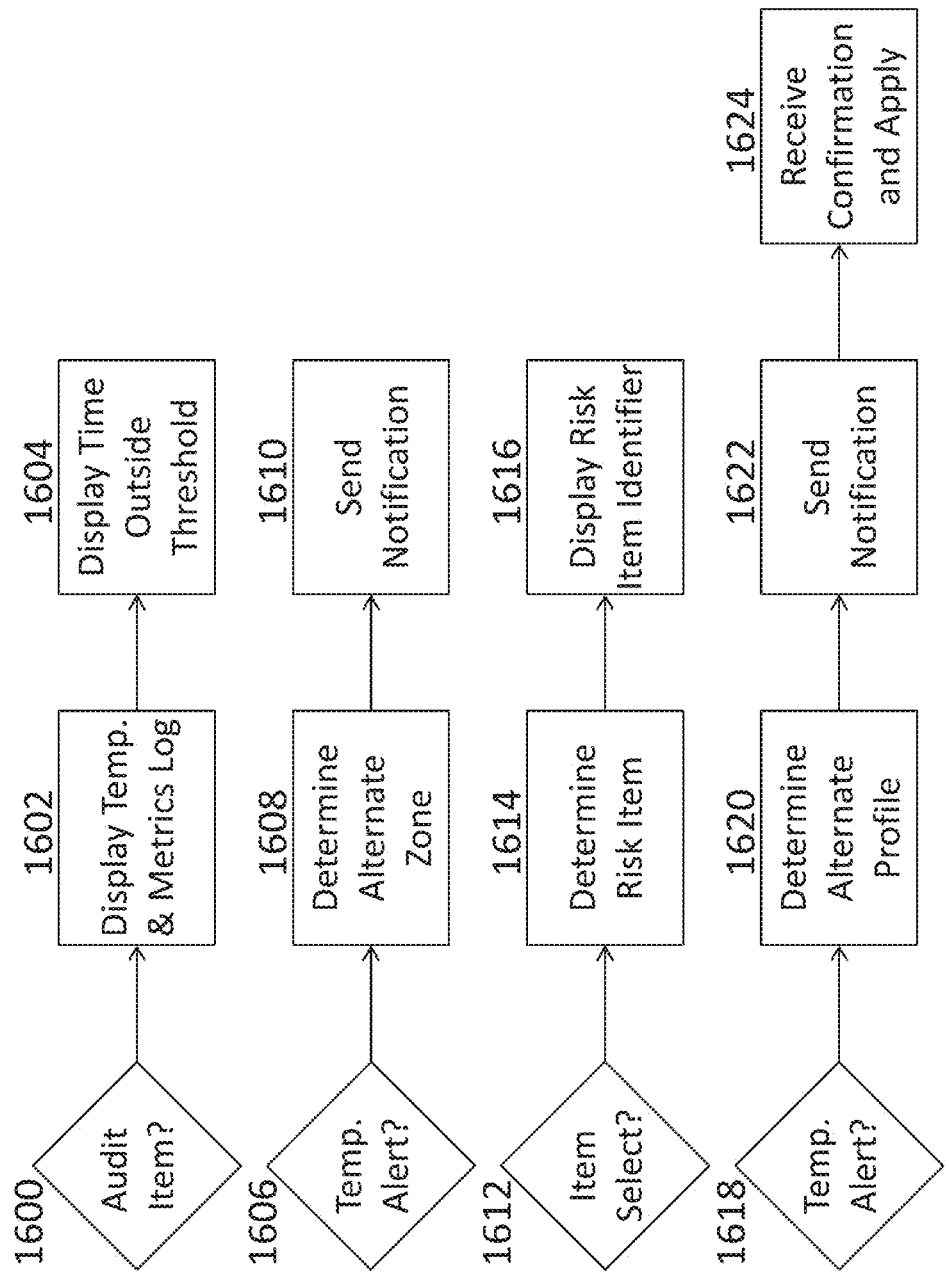
FIG. 16 shows a set of functionality embodied by sets of steps that may be performed automatically or upon request to monitor and manage inventoried items.

FIG. 16 shows further examples of methods or features that may be supported by an inventory managed cold-shed. Upon request by a user or by an automated process, any individual item or items stored in one or more zones may be audited (1600) by the CMCU (102) which may include displaying or determining (1602) a temperature, humidity, visible light, or other characteristics measured since its storage and displaying or determining (1604) the total time or individual periods of time which the item spent in improper conditions. Returning to the example of a vaccine, this could include a user request to see the status of all vaccines stored by the system and whether they are within proper storage thresholds based upon time spent in or out of storage. This could also include a scheduled and automated system process that might audit stored items once per day or once per week, and generate a notification via a user device or other device identifying vaccines which should be discarded due to expiration or improper storage.

Another process could include identifying items that are still in storage, and which may be affected by a temperature alert (1606) indicating that the temperature, or another environmental characteristic, of the zone that the item is stored in may be improper due to system malfunction, limited power availability, or adverse external conditions. If such an environmental alert is detected (1606), the CMCU (102) may determine (1608) an alternate zone that the item may be moved to in order to provide an environment closest to proper storage given the systems current capabilities. For example, if a vaccine were stored in a first compartment (214) which began to malfunction, resulting in a temperature increase, the CMCU (102) may determine that a second zone (216) is still functioning and offers a storage environment that is ideal or at least more desirable than the current storage environment of the first compartment. The CMCU (102) may then send a notification (1610) to a manager or administrator of the system instructing them to move the item to the alternate zone that was earlier identified.

Another process could include receiving an item selection (1612) via a user device or interface identifying an item type that a user desires. The CMCU (102) may determine an at risk item (1614) of the type selected and display to the user (1616), via a user device or other interface an identifier for the at risk item. An at risk item could include an item whose stored shelf life or environmental history log indicates that it is close to expiration or loss of efficacy and should be used promptly in order to minimize waste. Thus, by selecting a certain vaccine as the desired item (1612), the CMCU (102) may determine (1614) that a particular vaccine is closest to expiration based upon time or storage criteria and recommend that vaccine by its item identifier (1616) for the user to use instead.

Another process could include identifying a temperature, or other environmental characteristic, alert (1618) for one or more items and determining (1620) an alternate operational profile that the system may switch to in order to place the item or items back into proper storage requirements. Changing an operational profile may include switching to an alternate power source, adjusting power supply to cooling systems or dehumidifiers, disabling one or more non-critical devices, or other changes that may be automatically applied to the CMCU (102) or PCU (100) or both. Depending on the circumstance, a determined (1620) alternate profile may even include an operational profile that allows the temperature of one or more zones to go above or below ideal storage temperatures for items in that zone in order to focus available resources on cooling one or more other higher risk zones. For example, temperatures might be allowed to increase in a zone that stores ibuprofen and acetaminophen due to their low cost and long shelf life, in order to divert power and other resources to preserve optimal temperatures in a zone that stores expensive and hard to obtain vaccines. After determining (1620) one or more alternate profiles, the CMCU (102) or another device may send (1622) a notification to a user device of a remote or local manager or other system administrator proposing an operational change to one or more profiles. Upon receiving (1624) a confirmation or selection of a profile, the CMCU (102) may apply the selected profile to change the operational characteristics of one or more devices of the cold-shed.

Figure 18:
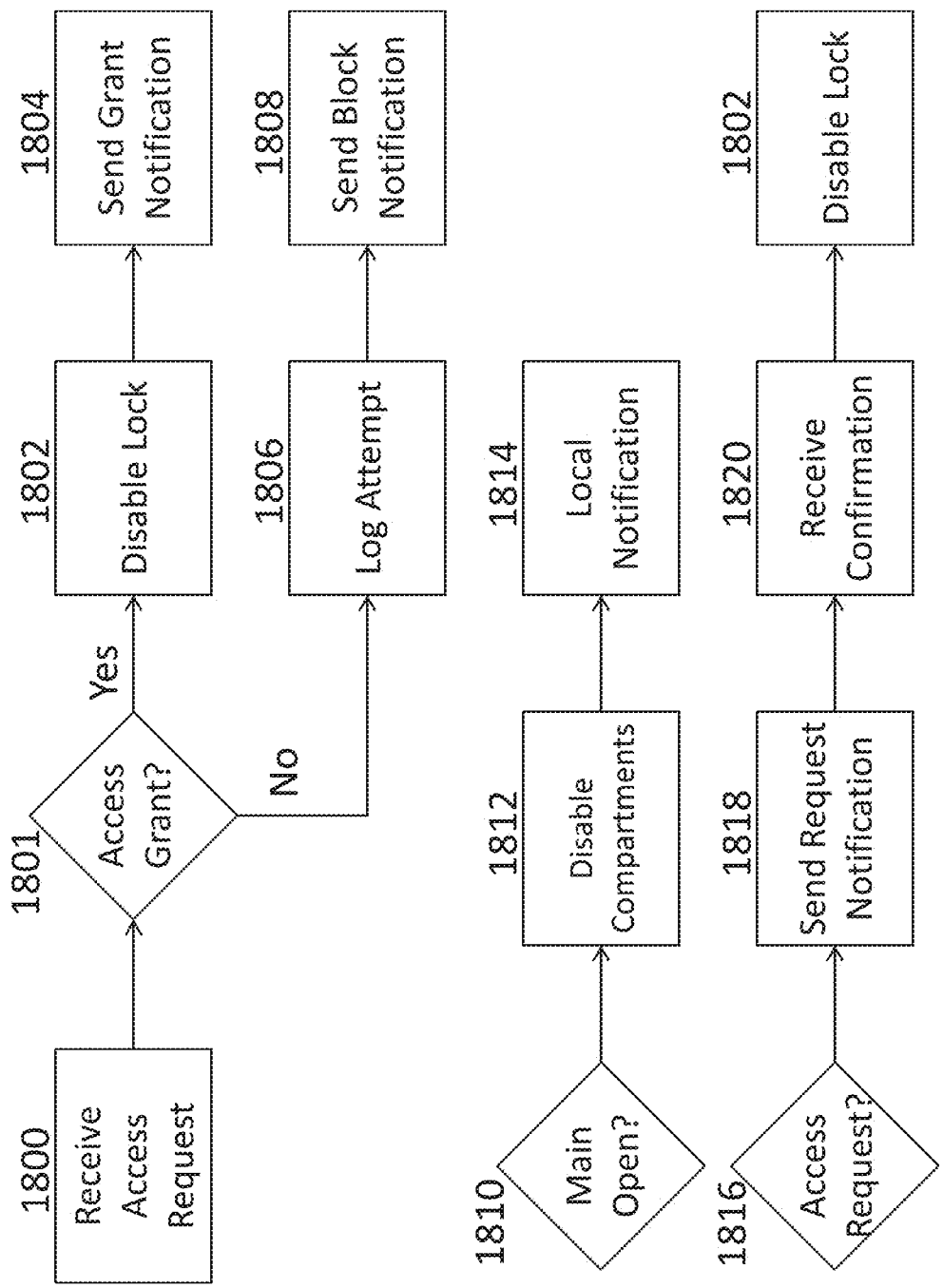
FIG. 18 shows a set of functionality embodied by sets of steps that may be performed to monitor and manage access to one or more zones of a cold-shed.

FIG. 18 shows further examples of methods or features that may be supported by an access controlled cold-shed. When an access request is received (1800) by the CMCU (102) as a result of a user entering a passcode or a machine readable code being read from a user identification card, access fob, or other device, the CMCU (102) may determine based upon such factors as user authorization lists, zone that access is requested to, data and time, environmental conditions, operational conditions, or other factors whether or not that user should be granted access (1801). If it is determined that access is granted (1801), the CMCU (102) may disable (1802) the mechanical or electronical automated locking mechanism or other security device that is barring access to the zone for which entry was requested and send (1804) an access grant notification to a local or remote manager, system administrator or other user via a user device. If the CMCU (102) determine that access should not be granted (1801) the CMCU (102) may log (1806) the access attempt which may include recording the passcode, identification card, or fob used to attempt access, and may also include audio, video, images, or other sensor information captured from sensors (116) proximate to the access attempt. The CMCU (102) may also send (1808) an access blocked notification to a remote or local manager or administrator of the cold-shed, to allow them to further investigate.

Another process could include, when the main door to the cold storage area (202) is open (1810), disabling (1812) one or more other zone compartments doors within the cold storage area (202) until the main door is closed. This could prevent strong winds, rain, and/or high temperature from outside the cold storage area (202) from entering a zone compartment and mixing or pushing out temperature controlled and humidity controlled gases at rest inside. The CMCU (102) may also cause a local notification (1814) while the main door is open (1810), such as a flashing light, intermittent audio tone, or other warning intended to prompt a user to close the door and preserve the interior.

Another process could include, when a request for access from a user is received by the CMCU (102) as a result of that user providing a machine readable code to a device, sending an access request notification (1818) to a local or remote manager or administrator of the system via a user device. The notification sent (1818) might include such information as the identification of the user requesting access, what zone, area or compartment he or she is requesting access to, and in some cases may include audio, video, images, or other information captured from sensors proximate to the access request. The person receiving the notification may review the request, and send a confirmation back via the user device that may be received (1820) by the CMCU (102) and, once verified, cause the CMCU (102) to disable (1802) the locking mechanism or other security device that is preventing access to the requested zone.

V. Miscellaneous

Further variations on, and features for, the inventors' technology will be immediately apparent to, and could be practiced without undue experimentation by, those of ordinary skill in the art in light of this disclosure. Accordingly, instead of limiting the protection accorded by this document, or by any document which is related to this document, to the material explicitly disclosed herein, the protection should be understood to be defined by the claims, if any, set forth herein or in the relevant related document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to such claims based on the above disclosure is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

EXPLICIT DEFINITIONS

When appearing in the claims, a statement that something is "based on" something else should be understood to mean that something is determined at least in part by the thing that it is indicated as being "based on." When something is required to be completely determined by a thing, it will be described as being "based exclusively on" the thing.

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft® WORD on a computer "configures" that computer to function as a word processor, which it does by using the instructions for Microsoft WORD in combination with other inputs, such as an operating system, and various peripherals (e.g., a keyboard, monitor, etc).

When used in the claims, "determining" should be understood to refer to generating, selecting, defining, calculating or otherwise specifying something. For example, to obtain an output as the result of analysis would be an example of "determining" that output. As a second example, to choose a response from a list of possible responses would be a method of "determining" a response. As a third example, to identify data received from an external source (e.g., a microphone) as being a thing would be an example of "determining" the thing.

When used in the claims, a "set" should be understood to refer to a collection containing zero or more objects of the type that it refers to. So, for example, a "set of integers" describes an object configured to contain an integer value, which includes an object that contains multiple integer values, an object that contains only a single integer value, and an object that contains no integer value whatsoever.

The invention claimed is:
1. A monitored shed comprising:
   a. a primary storage area comprising a general storage area and a first storage zone, wherein the first storage zone is a sealed compartment that is contained within the primary storage area, and the general storage area is an open space within the primary storage area;
   b. a temperature change device operable to influence the temperature within the primary storage area, wherein:
      (i) the temperature change device is a primary cooling device,
      (ii) the temperature change device is operable to primarily influence the temperature within the primary storage area, and
      (iii) the primary cooling device is configured to vent heat to an exterior of the primary storage area;
   c. a set of sensors, the set of sensors comprising a temperature sensor configured to generate a set of temperature data associated with the primary storage area;
   d. a power system, the power system comprising a set of solar cells and a set of batteries, the power system configured to provide power to at least the temperature change device and the set of sensors, wherein the power system is configured to generate a set of power data, the set of power data comprising a power generation associated with the set of solar cells, a battery charge associated with the set of batteries, and a power consumption; and
   e. a control unit comprising a memory, a processor, and a wireless communication device;
   f. the first storage zone comprising a second temperature change device, wherein:

23

(i) the second temperature change device is a thermoelectric cooling device,
(ii) the second temperature change device is operable to primarily influence the temperature within the first storage zone, and
(iii) the thermoelectric cooling device is configured to exchange thermal energy with the interior of the general storage area;

wherein the processor is configured to execute instructions to cause the control unit to:
i. receive the set of temperature data and the set of power data;
ii. determine a temperature report for the primary storage area based upon the set of temperature data;
iii. determine a power report for the power system based upon the set of power data;
iv. provide the temperature report and the power report to a user device via the wireless communication device;
v. receive a general storage goal temperature and a first storage zone goal temperature from the user device; and
vi. configure the temperature change device to influence the temperature within the primary storage area based upon the general storage goal temperature, and configure the second temperature change device to influence the temperature within the first storage zone based upon the first storage zone goal temperature.

2. The monitored shed of claim 1, wherein the processor is further configured to execute instructions to cause the control unit to:
a. receive a temperature alarm range from the user device; and
b. where the set of temperature data indicates that the temperature of the primary storage area falls outside of the temperature alarm range, provide a temperature alarm report to the user device.

3. The monitored shed of claim 1, wherein the primary cooling device is one of an evaporative cooling device, a vapor-compression cooling device, or an absorption refrigeration cooling device, and wherein:
a. the temperature change device is configured to operate intermittently and reduce the temperature of the primary storage area to the general storage goal temperature;
b. the second temperature change device is configured to operate continuously and increase or reduce temperature to maintain the temperature of the first storage zone at the first storage zone goal temperature; and
c. the thermoelectric cooling device is configured to:
(i) require less power from the power system than the primary cooling device, such that the power system may operate the thermoelectric cooling device when the power system has insufficient power available to operate the primary cooling device, and
(ii) automatically dehumidify the first storage zone when reducing the temperature of the first storage zone.

4. The monitor shed of claim 1, further comprising an inventory management input device, wherein the set of sensors further comprises a first storage zone temperature sensor, wherein the processor is further configured to execute instructions to:
a. receive an inventory identifier via the inventory management input device;
b. associate the inventory identifier with the first storage zone; and

24 c. associate a set of first storage zone temperature data with the inventory identifier, wherein the set of first storage zone temperature data indicates one or more temperatures of the first storage zone for the period of time that the inventory identifier is associated with the first storage zone.

5. The monitored shed of claim 4, wherein the second temperature change device is configured to only receive power via the set of solar cells, and wherein the processor is further configured to execute instructions to:
a. determine, based upon at least the inventory identifier, an ideal storage temperature range and a non-ideal storage time limit associated with the inventory identifier, wherein the non-ideal storage time limit indicates a period of time at which an item associated with the inventory identifier may be stored outside of the ideal storage temperature range;
b. determine a non-ideal storage time based upon the set of first storage zone temperature data, wherein the non-ideal storage time indicates a period of time during which the inventory identifier was associated with the first storage zone and the first storage zone temperature fell outside of the ideal storage temperature range;
c. provide an inventory report to the user device, wherein the inventory report comprises the non-ideal storage time and the non-ideal storage time limit; and
d. prevent access to the first storage zone for at least one user when ambient temperatures outside of the monitored shed would result in an increase of non-ideal storage time for the inventory identifier if the first storage zone were accessed.

6. A method for monitoring a shed comprising the steps:
a. receiving, at a control unit comprising a memory, a processor, and a wireless communication device, a general storage goal temperature and a first storage zone goal temperature from a user device;
b. configuring a temperature change device to influence the temperature within a primary storage area based upon the general storage goal temperature, and configuring a second temperature change device to influence the temperature within a first storage zone based upon the first storage zone goal temperature;
c. receiving a set of temperature data generated by a temperature sensor, the set of temperature data indicating the temperature within the primary storage area;
d. receiving a set of power data generated by a power system, the power system comprising a set of solar cells and a set of batteries, the set of power data comprising a power generation associated with the set of solar cells, a battery charge associated with the set of batteries, and a power consumption;
e. determining:
i. a temperature report for the primary storage area based upon the set of temperature data; and
ii. a power report for the power system based upon the set of power data; and
f. providing the temperature report and the power report to the user device via the wireless communication device;
wherein:
(A) the primary storage area comprises the first storage zone that is a sealed compartment contained within the primary storage area, and a general storage area that is an open space within the primary storage area;
(B) the temperature change device is a primary cooling device that is operable to primarily influence the temperature within the primary storage area, and that is configured to vent heat to an exterior of the primary storage area;

(C) the first storage zone comprises the second temperature change device that is a thermoelectric cooling device, and that is operable to primarily influence the temperature within the first storage zone, and that is configured to exchange thermal energy with the interior of the general storage area;

(D) the temperature change device is operable to reduce the temperature of the primary storage area and the first storage zone to the general storage goal temperature; and (E) the second temperature change device is operable to increase or reduce temperature to maintain the temperature of the first storage zone at the first storage zone goal temperature d.

7. The method of claim 6, further comprising the steps:
a. receiving a temperature alarm range from the user device; and
b. where the set of temperature data indicates that the temperature of the primary storage area falls outside of the temperature alarm range, providing a temperature alarm report to the user device.

8. The method of claim 6, further comprising the steps:
a. receiving a battery alarm range from the user device; and
b. where the set of power data indicates that the battery charge falls outside of the battery alarm range, provide a battery alarm report to the user device.

9. The method of claim 8, further comprising the steps:
a. determining that one or more of the power generation and the battery charge are insufficient based upon the power consumption;
b. activating a secondary power source automatically and without human intervention, wherein the secondary power source is configured to provide power to the power system, and wherein the secondary power source is selectively operable; and
c. preventing access to one or more of the primary storage area and the first storage zone while the secondary power source is activated.

* * * * *